United States Patent
Kobashi

(10) Patent No.: US 11,209,692 B2
(45) Date of Patent: Dec. 28, 2021

(54) COLOR FILTER AND REFLECTIVE DISPLAY DEVICE

(71) Applicant: TOPPAN PRINTING CO., LTD., Taito-ku (JP)

(72) Inventor: Yasuhiro Kobashi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 249 days.

(21) Appl. No.: 16/253,583

(22) Filed: Jan. 22, 2019

(65) Prior Publication Data

US 2019/0154893 A1    May 23, 2019

Related U.S. Application Data

(63) Continuation of application No. PCT/JP2017/026252, filed on Jul. 20, 2017.

(30) Foreign Application Priority Data

Jul. 22, 2016 (JP) .............................. JP2016-144696

(51) Int. Cl.
  *G02B 5/20* (2006.01)
  *G02F 1/1335* (2006.01)
  *G02F 1/1677* (2019.01)

(52) U.S. Cl.
  CPC ......... *G02F 1/133514* (2013.01); *G02B 5/20* (2013.01); *G02B 5/201* (2013.01); *G02F 1/1335* (2013.01); *G02F 1/1677* (2019.01)

(58) Field of Classification Search
  CPC .. G02B 5/201; G02B 5/20; G02B 5/26; G02F 1/133514; G02F 1/1335; G02F 1/677
  (Continued)

(56) References Cited

U.S. PATENT DOCUMENTS

| 6,124,909 A | 9/2000 | Miyashita et al. |
| 2008/0316401 A1 | 12/2008 | Chang |

(Continued)

FOREIGN PATENT DOCUMENTS

| JP | 4-355722 A | 12/1992 |
| JP | 2003-107234 A | 4/2003 |

(Continued)

OTHER PUBLICATIONS

International Search Report dated Oct. 24, 2017 in PCT/JP2017/026252, filed Jul. 20, 2017, 5 pages.

(Continued)

*Primary Examiner* — Kristina M Deherrera
(74) *Attorney, Agent, or Firm* — Oblon, McClelland, Maier & Neustadt, L.L.P.

(57) ABSTRACT

A color filter including a substrate and colored parts formed on the substrate. The substrate has a surface having rectangular unit regions defined by evenly dividing the surface along a first direction and a second direction orthogonal to the first direction. Each of the rectangular unit regions has four rectangular sub-regions which are three colored regions and one uncolored region. A first colored region has a first boundary with the uncolored region and a second boundary with a second colored region. A first colored part is formed in the first colored region with a first gap being formed in the first direction between the first boundary and a side of the first colored part facing the first boundary, and with a second gap greater than the first gap being formed in the second direction between the second boundary and a side of the first colored part facing the second boundary.

20 Claims, 6 Drawing Sheets

(58) Field of Classification Search
USPC .................................. 359/891; 349/106–109
See application file for complete search history.

(56) References Cited

U.S. PATENT DOCUMENTS

| | | | |
|---|---|---|---|
| 2013/0027765 A1* | 1/2013 | Kim .................... | G02F 1/1677 |
| | | | 359/296 |
| 2013/0088769 A1 | 4/2013 | Fujishiro et al. | |
| 2013/0141777 A1 | 6/2013 | Fujishiro et al. | |
| 2014/0300845 A1 | 10/2014 | Tamaki et al. | |

FOREIGN PATENT DOCUMENTS

| | | |
|---|---|---|
| JP | 2003-161964 A | 6/2003 |
| JP | 2014-203004 A | 10/2014 |
| WO | WO 2011/155410 A1 | 12/2011 |

OTHER PUBLICATIONS

Extended European Search Report dated Jul. 4, 2019, in Patent Application No. 17831089.2, 10 pages.

\* cited by examiner

COLOR FILTER AND REFLECTIVE DISPLAY DEVICE

CROSS-REFERENCE TO RELATED APPLICATIONS

The present application is a continuation of International Application No. PCT/JP2017/026252, filed Jul. 20, 2017, which is based upon and claims the benefits of priority to Japanese Application No. 2016-144696, filed Jul. 22, 2016. The entire contents of these applications are incorporated herein by reference.

BACKGROUND OF THE INVENTION

Field of the Invention

The present invention relates to a color filter and a reflective display device.

Discussion of Background

As electronic information networks spread widely, electronic publications, typically electronic books, are becoming more common. For example, self-luminous display devices or backlight display devices are often used as devices for displaying information of electronic publications.

The display screens of these display devices, however, have higher brightness than, for example, print media such as paper. Therefore, continuing viewing of the screens of such display devices for a long period of time easily makes users tired. In addition, since these display devices are power-consuming, driving them with a battery, for example, unavoidably limits the period of time of display.

In this regard, for example, reflective display devices, typically electronic paper, display electronic information by means of reflected light, so that the users can read the electronic information, just as they read information on paper. Therefore, the users are less likely to be tired. Further, for example, reflective display devices are suitable for use as outdoor sign boards because these display devices can exhibit their display performance if only sunlight or illumination light is available in the sites where they are used. Reflective display devices consume electrical power only when rewriting onscreen information, and therefore reduce power consumption, enabling longer operation even if the devices are battery-driven.

Reflective display devices are also commonly used as electronic sign boards or electronic price tags.

Such reflective display devices, if they merely display, for example, textual information, only need to provide black and white presentation. However, color display is more preferable when presenting electronic information in book illustrations, advertisements, sign boards, displays for enhancing an eye-catching effect, images, catalogs, shelf labels, price tags, instructions or the like. As display content is colored more in these display usages, there is a growing need of achieving color display in reflective display devices.

As reflective display devices for providing color display, for example, reflective display devices as set forth below have been proposed.

PTL 1 suggests a multicolor display panel including a pair of substrates with a display unit interposed therebetween. The display unit contains particles that move or rotate by application of an electric field. In this display panel, a color filter is formed on at least one transparent substrate of the pair of substrates.

PTL 1 describes a color filter in which three square layers respectively colored in the primary colors are arrayed in a square lattice pattern.

PTL 2 proposes a reflective color display having a color filter in which a plurality of colored parts of different colors are arranged in a predetermined pattern, with a gap of 1 μm or more and 20 μm or less being provided therebetween and with no provision of black matrix therebetween.

PTL 1: JP 2003-161964 A
PTL 2: JP 2003-107234 A

SUMMARY OF THE INVENTION

According to an aspect of the present invention, a color filter includes a substrate that transmits visible light, and colored parts which are formed on the substrate and transmit non-white light. The substrate has a surface having rectangular unit regions defined by evenly dividing the surface along a first direction and a second direction orthogonal to the first direction. Each of the rectangular unit regions has four rectangular sub-regions defined by evenly dividing each of the rectangular unit regions into two along the first direction and two along the second direction. The four rectangular sub-regions in each of the rectangular unit regions are three colored regions in which the colored parts are respectively formed and one uncolored region in which none of the colored parts is formed. A first colored region of the three colored regions has a first boundary with the uncolored region and a second boundary with a second colored region. A first colored part of the colored parts is formed in the first colored region such that a first gap is formed in the first direction between the first boundary and a side of the first colored part facing the first boundary, and that a second gap greater than the first gap is formed in the second direction between the second boundary and a side of the first colored part facing the second boundary.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
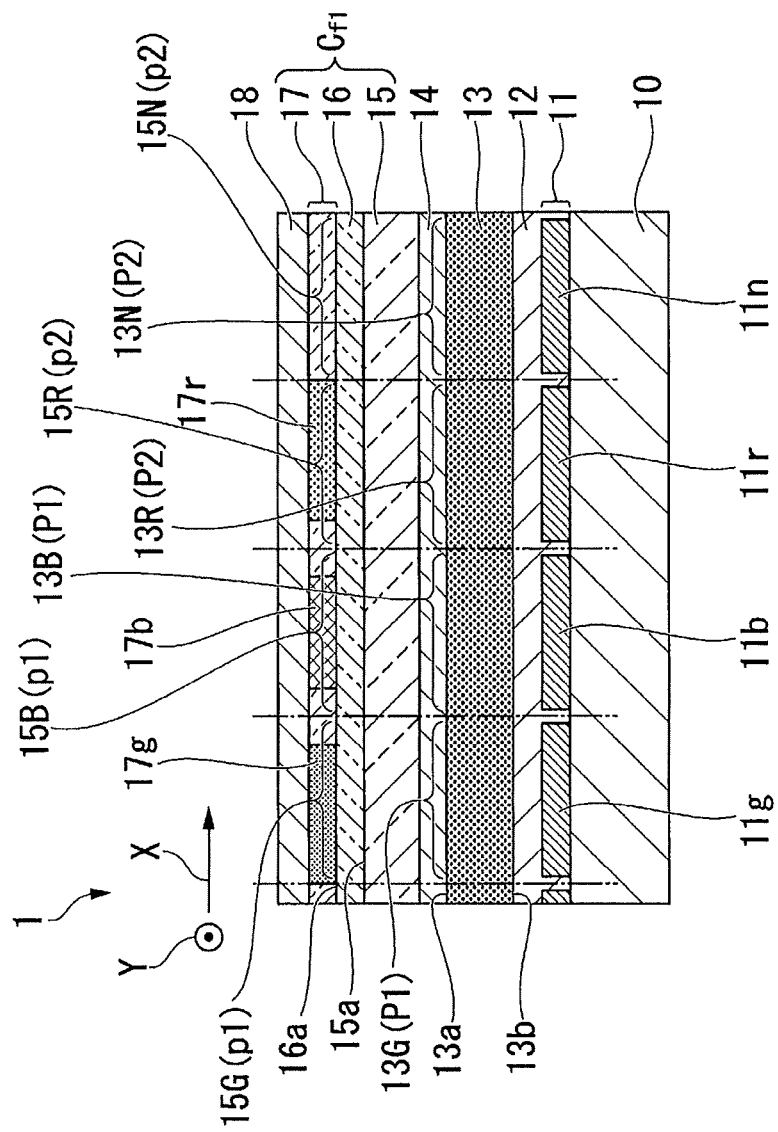
FIG. 1 is a schematic vertical cross-sectional view illustrating a configuration of a major portion of a reflective display device according to an embodiment of the present invention.

The embodiments will now be described with reference to the accompanying drawings, wherein like reference numerals designate corresponding or identical elements throughout the various drawings.

With reference to the accompanying drawings, a color filter and a reflective display device according to an embodiment of the present invention will be described.

FIG. 1 is a schematic vertical cross-sectional view illustrating a configuration of a major portion of a reflective display device according to an embodiment of the present invention. In FIG. 1 illustrating a schematic view, some shapes and dimensions are drawn at a larger scale (the same applies to the subsequent drawings).

FIG. 1 shows a configuration of a major portion of a reflective display 1 (reflective display device) of the present embodiment. As shown, the reflective display 1 is constituted by laminating in this order a base material 10, a first electrode layer 11, an adhesive layer 12, a reflective display layer 13, a second electrode layer 14, an optically transparent base material 15 (substrate), a color filter layer 17, and a protective layer 18. The optically transparent base material 15 and the color filter layer 17 constitute a color filter $C_{fl}$ of the present embodiment.

The reflective display 1 serves as a reflective display device that divides (disperses) externally incident light into a first color, a second color, and a third color by means of the color filter layer 17 and adjusts the amount of reflected light of the three colors by means of the reflective display layer 13 which is driven based on an image signal, thereby displaying a color image. The reflective display 1 may display a color image in full color or in multicolor other than full color.

The reflective display 1 has an effective display screen whose contour is not particularly limited. The effective display screen refers to a screen that can switch mode of display. The following description is provided by way of an example in which the effective display screen of the reflective display 1 has a rectangular contour. However, the contour may be in a circular, oval or polygonal shape, or other shapes.

The base material 10 is constituted of a plate insulator. The base material 10 may be made of, for example, synthetic resin film, glass, or other materials.

The base material 10 has a surface on which the first electrode layer 11 is laminated.

The first electrode layer 11 applies a drive voltage to the reflective display layer 13 to change reflectivity of the reflective display layer 13 as will be described later. In the present embodiment, the first electrode layer 11 is patterned to include a plurality of sub-pixel electrodes in conformity with the configuration and arrangement of sub-pixel regions, which serve as color display units of the reflective display 1, so that a voltage can be independently applied to the sub-pixel regions of the pixel regions.

As will be described later, each pixel region and each sub-pixel region are both rectangular in plan view in the present embodiment, and therefore each sub-pixel electrode of the first electrode layer 11 is also rectangular. Each sub-pixel electrode may have a substantially rectangular contour with a recess or a protrusion being formed in part in plan view, depending on, for example, the arrangement of the switching element which will be described later The sub-pixel electrodes of the first electrode layer 11 are similarly configured in terms of varying reflectance of the reflective display layer 13, which will be described later, between black (0%) and white (100%). Depending on the type of the drive signal to be applied, however, the sub-pixel electrodes in each pixel region are distinguished as a first-color sub-pixel electrode 11r, a second-color sub-pixel electrode 11g, a third-color sub-pixel electrode 11b, and an achromatic sub-pixel electrode 11n.

The first-, second- and third-color sub-pixel electrodes 11r, 11g and 11b serve as drive electrodes to which a drive voltage is applied based on a drive signal for controlling gradation of a first color component, a second color component, and a third color component of the pixel region.

The achromatic sub-pixel electrode 11n serves as a drive electrode to which a drive voltage is applied based on a drive signal for controlling gradation of an achromatic component of the pixel region.

The first electrode layer 11 is formed of an appropriate metallic material.

On the first electrode layer 11, the reflective display layer 13 is laminated via the adhesive layer 12.

The adhesive layer 12 may be made of any material as long as the first electrode layer 11 can be bonded to a surface 13b of the reflective display layer 13.

The reflective display layer 13 has an appropriate layer structure that can switch display mode at least between white and black in response to an electric field being applied in the thickness direction (that is the thickness direction of the reflective display 1 or the base material 10).

In the present embodiment, the reflective display layer 13 is so configured that the reflectance gradually varies from minimum (black) to maximum (white) according to the magnitude of the electric field. Hence, the reflective display layer 13 is capable of white-to-black gradation expression.

The reflective display layer 13 may have reflectance varying between the surface 13b and a surface 13a which is on the opposite side of the surface 13b.

The reflective display layer 13 may have a configuration based on a process selected from a reflective liquid crystal process, a cholesteric liquid crystal process, an electrophoretic process (e.g., microcapsule method), a micro-cup process, an electrochromic process, and the like.

The second electrode layer 14 is a transparent electrode laminated on the surface 13a of the reflective display layer 13.

In the present embodiment, the second electrode layer 14 is arranged covering the entire first electrode layer 11 (in plan view).

The drive electrodes of the first electrode layer 11 and the second electrode layer 14 are connected to a drive power source, not shown, via respective switching elements, not shown. When the switching elements are driven in response to an image signal, an electric field is generated between the drive electrodes and the second electrode layer 14, due to the drive voltage corresponding to the image signal.

The second electrode layer 14 may be made of, for example, electrically conductive transparent material such as indium tin oxide (ITO).

The optically transparent base material 15 is a layer that has optical transparency for visible light and is laminated on the second electrode layer 14.

The optically transparent base material 15 may be made of, for example, a glass base material. The optically transparent base material 15 may be, for example, a film base material such as a PET (polyethylene terephthalate) film and a PEN (polyethylene naphthalate) film.

The optically transparent base material 15 may have a surface 15a provided with an ink-receiving layer 16 for holding an ink that forms a color filter layer 17, which will be described later.

If the color filter layer 17 can be directly formed on the optically transparent base material 15, the ink-receiving layer 16 may be omitted. If the color filter layer 17 is formed by ink-jet printing or other printing method, the ink-receiving layer 16 may preferably be provided to appropriately hold an ink at the time of printing.

In the present embodiment, a description will be given by way of an example in which the reflective display 1 includes the ink-receiving layer 16.

The ink-receiving layer 16 is an optically transparent layer formed for holding the color filter layer 17, which will be described later, above the optically transparent base material 15. The ink-receiving layer 16 may have a thickness in the range of 4 µm or more and 10 µm or less.

If the thickness of the ink-receiving layer 16 is less than 4 µm, the ink-receiving layer 16 may not sufficiently absorb the solvent in the ink, so that the ink may excessively wet-spread. In addition, if an attempt is made to have an ink-receiving layer 16 with a thickness of less than 4 µm, there may be produced a part where the ink-receiving layer 16 is not formed due to manufacturing variation.

If the thickness of the ink-receiving layer 16 exceeds 10 µm, there will be an excessively large distance between the reflective display layer 13 and the color filter layer 17 which will be described later. As a result, the light reflected by the reflective display layer 13 may be diffused at the ink-receiving layer 16, so that less light will pass through the color filter layer 17, possibly lowering color reproducibility.

The ink-receiving layer 16 is laminated on the surface 15a of the optically transparent base material 15, the surface 15a being on a side opposite to the surface contacting the second electrode layer 14.

The ink-receiving layer 16 may be made of a material suitable for holding the ink for forming the color filter layer 17. Examples of the material used for the ink-receiving layer 16 may include a urethane resin, a polyester resin, an acrylic resin, a vinyl alcohol resin, or the like.

To further improve blocking (adhesion) prevention performance of surfaces at the time of lamination, the material of the ink-receiving layer 16 more preferably contains a silicone resin.

The ink-receiving layer 16 is more preferably made of a material having high transparency to visible light and having a characteristic of not easily allowing the received ink to undergo discoloration or shading in a usage environment. The ink-receiving layer 16 is more preferably formed of a material capable of holding an ink at the position where the ink is printed so that the evenness of the wet-spread ink is not impaired at the time of forming the color filter layer 17.

Examples of the material of the ink-receiving layer 16 include one used for an ink-jet recording medium mentioned in JP 2000-43305 A, and one used for a recording medium for an ink-jet printer mentioned in JP 2008-272972 A.

The method of forming the ink-receiving layer 16 is not particularly limited. For example, the ink-receiving layer 16 may be formed by coating the optically transparent base material 15 with a coating liquid for forming the ink-receiving layer 16, and then drying or solidifying the coating liquid.

Examples of the solvent for forming the coating liquid for forming the ink-receiving layer include aqueous solvents or alcohol solvents such as water, IPA (isopropyl alcohol), and the like, and organic solvents. For example, if the ink-receiving layer 16 is mainly composed of a urethane resin, an organic solvent such as toluene, ethyl acetate, or the like, which is highly soluble in the urethane resin, may be used in the coating liquid for forming the ink-receiving layer.

The coating device for applying the coating liquid for forming the ink-receiving layer is not particularly limited. Examples of the coating device include a die coater, a spin coater, a bar coater, and the like.

For example, as a method of drying the coating liquid for forming the ink-receiving layer, heating, vacuum pressure reduction, or the like may be used. For example, as a method of solidifying the coating liquid for forming the ink-receiving layer, UV radiation may be used if the coating liquid is a UV curable resin.

The color filter layer 17 is laminated on a surface 16a of the ink-receiving layer 16 on the optically transparent base material 15. In other words, the color filter layer 17 is laminated on the surface 16a of the ink-receiving layer 16, which is on a side opposite to the surface contacting the optically transparent base material 15.

The color filter layer 17 includes first-color colored parts 17r (colored parts), second-color colored parts 17g (colored parts), and third-color colored parts 17b (colored part).

The first-color colored parts 17r have a wavelength band that only transmits a first-color wavelength component. The second-color colored part 17g has a wavelength band that only transmits a second-color wavelength component. The third-color colored part 17b has a wavelength band that only transmits a third-color wavelength component.

The first, second and third colors are not particularly limited as long as they are non-white, have different wavelength bands, and are capable of full color or multi-color display in combination.

To produce full color display, the first, second and third colors are preferably combined such that white light is produced when the transmitted light of these colors is mixed.

For example, the first, second and third colors may respectively be red, green and blue, or may respectively be cyan, magenta and yellow.

If the reflective display 1 does not require full color display, the three colors may be combined as appropriate for required multi-color display. In addition to the six colors described above, three colors selected from the group consisting, for example, of yellow, violet, orange, and yellow-green may be used.

For simplicity, the first-color colored part 17r, the second-color colored part 17g, and the third-color colored part 17b may be collectively referred to as colored parts in the following description.

The first-color colored part 17r, the second-color colored part 17g, and the third-color colored part 17b are arranged so as to respectively face the first-color sub-pixel electrode 11r, the second-color sub-pixel electrode 11g, and the third-color sub-pixel electrode 11b, with the reflective display layer 13 being sandwiched therebetween.

It should be noted that none of the colored parts is arranged on the surface 16a at portions respectively facing the achromatic sub-pixel electrodes 11n.

In the present embodiment, the colored parts are separated from the surface 13a of the reflective display layer 13 by an optically transparent layer that is a laminate of the second electrode layer 14, the optically transparent base material 15, and the ink-receiving layer 16.

A description will now be given of the configuration of the pixel regions and the arrangement pattern in the color filter layer 17 in plan view.

Figure 2:
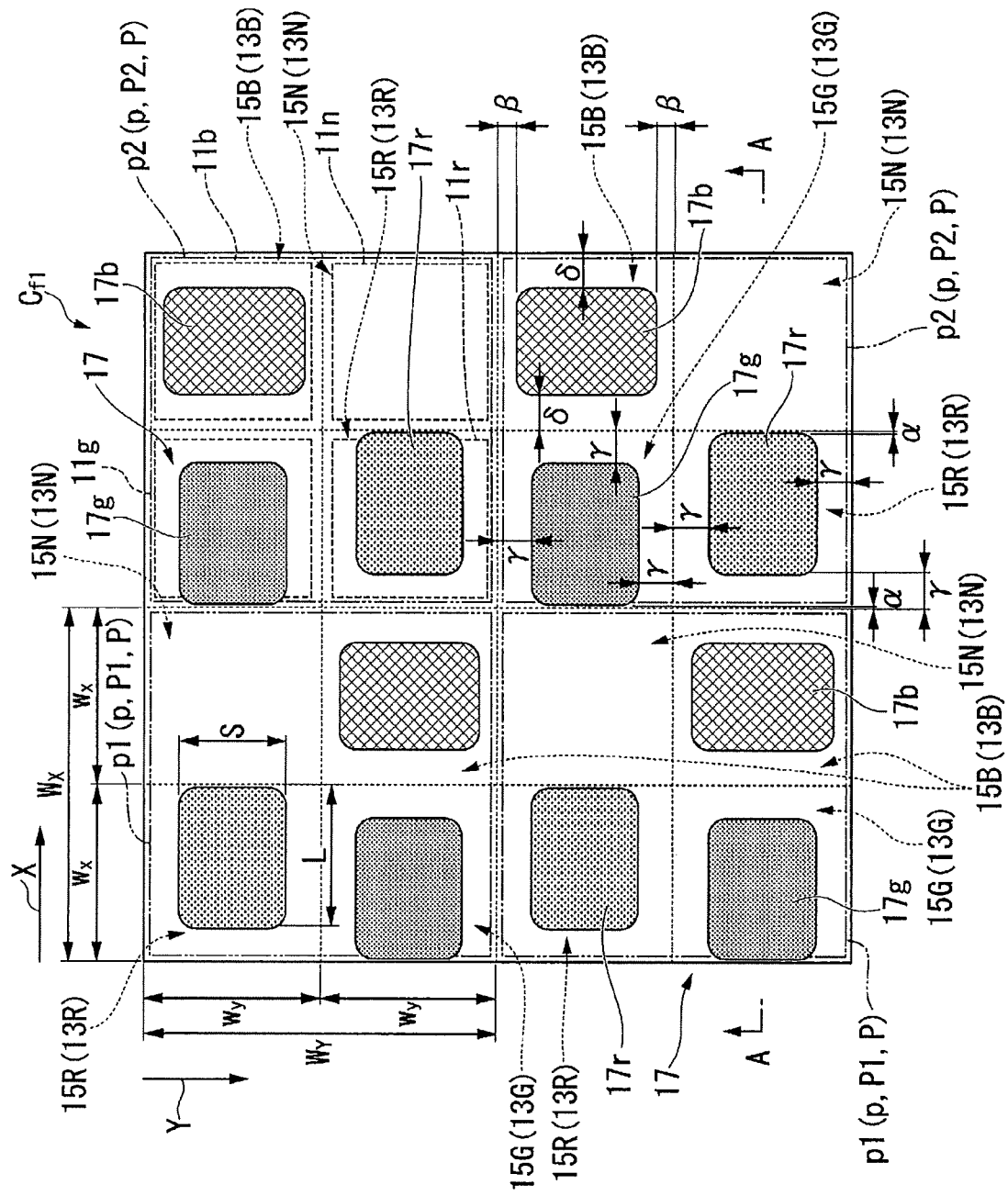
FIG. 2 is a schematic plan view illustrating an array of colored parts of a color filter according to an embodiment of the present invention.

FIG. 2 is a schematic plan view illustrating an array of colored parts in a color filter according to an embodiment of the present invention.

FIG. 2 shows an arrangement pattern in plan view of colored parts in four pixel regions P of the reflective display 1. However, the protective layer 18 is not illustrated. The A-A cross section of FIG. 2 corresponds to the cross section of FIG. 1 with the omission of the protective layer 18. In FIG. 2, the X direction corresponds to the left-right direction as viewed in the figure, and the Y direction corresponds to the up-down direction as viewed in the figure.

Such an arrangement pattern, as shown, of the colored parts in the color filter layer 17 is iterated in the X direction (first direction) and the Y direction (second direction) over the entire effective display screen, not shown.

Each pixel region P is formed of four rectangular sub-pixel regions in total, with two being adjacent to each other in the X direction and two being adjacent to each other in the Y direction. Each rectangular sub-pixel region is a unit of change of reflectance of the reflection display layer 13.

Each pixel region P is divided into four sub-pixel regions, i.e., a first sub-pixel region 13R, a second sub-pixel region 13G, a third sub-pixel region 13B, and a fourth sub-pixel region 13N.

The first sub-pixel region 13R has reflectance changed by the first-color sub-pixel electrode 11r, and has a rectangular shape covering the first-color sub-pixel electrode 11r in plan view.

The second sub-pixel region 13G has reflectance changed by the second-color sub-pixel electrode 11g, and has a rectangular shape covering the second-color sub-pixel electrode 11g in plan view.

The third sub-pixel region 13B has reflectance changed by the third-color sub-pixel electrode 11b, and has a rectangular shape covering the third-color sub-pixel electrode 11b in plan view.

The fourth sub-pixel region 13N has reflectance change by the achromatic-color sub-pixel electrode 11n, and has a rectangular shape covering the achromatic-color sub-pixel electrode 11n in plan view.

Each pixel region P has a width $W_X$ in the X direction and a width $W_Y$ in the Y direction. The pixel regions P also have an array pitch of $W_X$ and $W_Y$ in the X and Y directions, respectively, because the adjacent pixel regions P are arranged contacting with each other with no gap therebetween. $W_X$ and $W_Y$ may be equal to or different from each other here.

Each sub-pixel region has a width $w_X$ (=$W_X/2$) in the X direction and a width $w_Y$ (=$W_Y/2$) in the Y direction. For example, $w_X$ (or $w_Y$) may be 150 μm or more and 190 μm or less. The following description may be given, assuming $w_X=w_Y=50$ (μm), as an example, if the dimension of portions is described with specific numerical values. In other words, no light-shielding member such as black matrix is provided at boundaries of adjacent sub-pixel regions of the present embodiment.

Each pixel region P is classified as a first pixel region P1 or a second pixel region P2.

The first and second pixel regions P1 and P2 are different from each other in the array of the sub-pixel regions, which depends on the arrangement of the sub-pixel electrodes.

The sub-pixel regions of the first pixel region P1 are arranged as follows. The first and second sub-pixel regions 13R and 13G are adjacent to each other in this order in the Y direction. The second and third sub-pixel regions 13G and 13B are adjacent to each other in this order in the X direction. The fourth sub-pixel region 13N is adjacent to the first sub-pixel region 13R in the X direction, and adjacent to the third sub-pixel region 13B in the Y direction.

The sub-pixel regions of the second pixel region P2 are arranged as follows. The second and first sub-pixel regions 13G and 13R are adjacent to each other in this order in the Y direction. The second and third sub-pixel regions 13G and 13B are adjacent to each other in this order in the X direction. The fourth sub-pixel region 13N is adjacent to the first sub-pixel region 13R in the X direction, and adjacent to the third sub-pixel region 13B in the Y direction.

The first and second pixel regions P1 and P2 are adjacent to each other in the X direction.

Thus, the first and second pixel regions P1 and P2 are alternately arrayed in the X direction.

The first pixel regions P1 are adjacent to each other in the Y direction. In other words, a plurality of first pixel regions P1 are arranged side by side in the Y direction. The second pixel regions P2 are adjacent to each other in the Y direction. In other words, a plurality of second pixel regions P2 are arranged side by side in the Y direction.

With such an arrangement pattern, an array of the second, third, first and fourth sub-pixel region 13G, 13B, 13R and 13N in this order is iterated in the X direction. Each row extending in the X direction is arranged being offset by two sub-pixel regions in the X direction, from the row that is adjacent in the Y direction.

In the Y direction, a first column of alternating the first and second sub-pixel regions 13R and 13G, and a second column of alternating the fourth and third sub-pixel regions 13N and 13B are formed. These first and second columns are alternately arrayed in the X direction.

In such an arrangement pattern, each sub-pixel region is adjacent to a total of four rectangular sub-regions in the X and Y directions and has the following adjacency relationship, except for the outermost peripheral sub-pixel regions (end portions throughout the periphery) of the effective display screen.

The first sub-pixel region 13R is adjacent to the third and fourth sub-pixel regions 13B and 13G in the X direction and two second sub-pixel regions 13G in the Y direction.

The second sub-pixel region 13G is adjacent to the fourth and third sub-pixel regions 13N and 13B in the X direction and two first sub-pixel regions 13R in the Y direction.

The third sub-pixel region 13B is adjacent to the second and first sub-pixel regions 13G and 13R in the X direction and two fourth sub-pixel regions 13N in the Y direction.

The fourth sub-pixel region 13N is adjacent to the first and second sub-pixel regions 13R and 13G in the X direction and two third sub-pixel regions 13B in the Y direction.

Thus, the first, second and third sub-pixel regions 13R, 13G and 13B are adjacent to at least one fourth sub-pixel region 13N.

The array of the colored parts in the color filter layer 17 will be described.

In the present embodiment, each colored part has a contour that is in a substantially rectangular shape, or a square shape, in plan view. The substantially rectangular shape herein includes rectangular shapes having fine unevenness on each side in plan view or having rounded corners.

When measuring various gaps described later, measurement is made for a distance from the longest straight line (hereinafter referred to as a side) of the contour of a colored part in plan view. For example, if the contour has rounded corners, the gap dimension from the rounded corner is ignored. In other words, the gap measured from the rounded corner is not taken to be a gap.

If each side of a colored part has fine unevenness in plan view, a straight line obtained by averaging the unevenness is regarded as a side.

The colored parts may be differently shaped from each other, but the following description is given by way of an example in which the colored parts are uniformly shaped.

Each colored part has a substantially rectangular shape whose longitudinal width is L (however, $L<w_X$, $L<w_Y$) and lateral width is S (however, S≤L). If each side of the colored part has fine unevenness in plan view, the width dimensions L and S each represent a distance between face-to-face sides of the colored part.

Three colored parts are arranged in each rectangular unit region p of the optically transparent base material 15. Each rectangular unit region p is a rectangular region with the same size as the pixel region P. The rectangular unit region p is classified as a first rectangular unit region p1 or a second rectangular unit region p2, respectively corresponding to the first pixel region P1 or the second pixel region P2.

The first rectangular unit region p1 (or the second rectangular unit region p2) is evenly divided into two in the X and Y directions, similarly to the first pixel region P1 (or second pixel region P2). The first rectangular unit region p1 (or second rectangular unit region p2) is evenly divided into a first rectangular sub-region 15R, a second rectangular sub-region 15G, a third rectangular sub-region 15B, a fourth rectangular sub-region 15N, respectively corresponding to the first sub-pixel region 13R, the second sub-pixel region 13G, the third sub-pixel region 13B, and the fourth sub-pixel region 13N of the first pixel region P1 (or the second pixel region P2).

In the following description, the first rectangular unit region p1 and the second rectangular unit region p2 may be collectively referred to as rectangular unit regions. The first rectangular sub-region 15R, the second rectangular sub-region 15G, the third rectangular sub-region 15B, and the fourth rectangular sub-region 15N may be collectively referred to as rectangular sub-regions.

FIGS. 1 and 2 show an example in which the color filter $C_{fl}$ is arranged in the reflective display 1 with no misregistration with the reflective display layer 13.

In this case, as shown in FIG. 2, the first and second rectangular unit regions p1 and p2, and the first, second, third and fourth rectangular sub-regions 15R, 15G, 15B and 15N are rectangular regions, onto which the first and second pixel regions P1 and P2, and the first, second, third and fourth sub-pixel regions 13R, 13G, 13B and 14N are respectively projected perpendicularly to the optically transparent base material 15.

The pixel regions may be displaced from the respective rectangular unit regions, i.e. the sub-pixel regions may be displaced from the respective rectangular sub-regions, in plan view due to manufacturing error. The relative displacement caused by a manufacturing error is taken to be $\Delta_e$ at the maximum in the X or Y direction. For example, the relative displacement $\Delta_e$ may be 10 μm, although it depends on the performance of the manufacturing process.

The first-color colored part 17r, the second-color colored part 17g, and the third-color colored part 17b are respectively arranged in the first rectangular sub-region 15R, the second rectangular sub-region 15G, and the third rectangular sub-region 15B. Thus, the first-color colored part 17r, the second-color colored part 17g, and the third-color colored part 17b are arranged so as to respectively face the first sub-pixel region 13R, the second sub-pixel region 13G, and the third sub-pixel region 13B in the thickness direction.

Thus, in the rectangular unit region p, the rectangular sub-regions 15R, 15G, and 15B are colored regions in which colored parts are respectively arranged. In contrast, the rectangular sub-region 15N is an uncolored region because no colored part is arranged therein.

As shown in FIG. 2, the colored parts are arranged in the respective rectangular sub-regions, each leaving appropriate gaps from the respective boundaries with the rectangular sub-regions.

In the first rectangular sub-region 15R, gaps γ (second gaps) are respectively formed between the three boundaries with two adjacent second rectangular sub-regions 15G and an adjacent third rectangular sub-region 15B, and the sides of the first-color colored part 17r respectively facing these boundaries. The gap γ has a width γ between each of these sides of the first-color colored part 17r and the corresponding one of the boundaries. To prevent colors of displayed light from being mixed, the size of the gap γ is determined so that each colored part does not cross over the boundaries even when manufacturing variation is considered. More specifically, the size of the gap γ is determined to be not less than the relative displacement $\Delta_e$ caused by such manufacturing error.

In the first rectangular sub-region 15R, a gap α (first gap) is formed between the boundary with an adjacent fourth rectangular sub-region 15N and the side of the first-color colored part 17r facing this boundary. The gap α has a width α between the side of the first-color colored part 17r and the boundary (however, 0≤α<γ). That is, the gap α may have zero width.

The reason why the gap α can be made narrower than the gap γ is that no colored part is arranged in the fourth rectangular sub-region 15N, so that there is no occurrence of color mixing even if manufacturing error occurs.

In the second rectangular sub-region 15G, the gaps γ are respectively formed between the three boundaries with two adjacent first rectangular sub-regions 15R and an adjacent third rectangular sub-region 15B, and the sides of the second-color colored part 17g respectively facing these boundaries.

In the second rectangular sub-region 15G, the gap α is formed between the boundary with an adjacent fourth rectangular sub-region 15N and the side of the second-color colored part 17g facing this boundary.

In the third rectangular sub-region 15B, gaps δ (second gaps) are respectively formed between the two boundaries with an adjacent first rectangular sub-region 15R and an adjacent second rectangular sub-region 15G, and the sides of the third-color colored part 17b respectively facing these boundaries. The gap δ has a width δ between each of these sides of the third-color colored part 17b and the corresponding one of the boundaries. To prevent colors of displayed light from being mixed, the size of the gap δ is determined so that each colored part does not cross over the boundaries even when manufacturing variation is considered. More specifically, the size of the gap γ is determined to be not less than the relative displacement $\Delta_e$ caused by such manufacturing error. The width δ may be equal to or different from the width γ.

In the third rectangular sub-region 15B, gaps β (first gaps) are respectively formed between the boundaries with two adjacent fourth rectangular sub-regions 15N and the sides of the third-color colored part 17b respectively facing these boundaries. The gap β has a width β between each of the sides of the third-color colored part 17b and the corresponding one of the boundaries (however, 0≤β<δ). That is, the gap β may have zero width.

The reason why the gap β can be made narrower than the gap δ is that no colored part is arranged in the fourth rectangular sub-region 15N, so that there is no occurrence of color mixing even if manufacturing error occurs.

In the present embodiment, the following Equations (1) to (4) are established because each colored part has a uniform size.

Equation 1

$$w_x = L + \alpha + \gamma \quad (1)$$

$$w_y = S + 2\cdot\gamma \quad (2)$$

$$w_x = S + 2\cdot\delta \quad (3)$$

$$w_y \leq L + 2\cdot\beta \quad (4)$$

As described above, of the plurality of colored parts, the first colored part in the first colored region adjacent, in the X or Y direction, to a fourth rectangular sub-region 15N, i.e. an uncolored region, is arranged such that the first gap (gap α, β) between the boundary with the uncolored region and the first colored part is narrower than the second gap (gap γ, δ) between the boundary with the second colored region, which is adjacent, in the X or Y direction, to the first colored region, and the first-color colored part.

In other words, in each colored part, the gaps α and β, which are adjacent to the fourth rectangular sub-region 15N, are made narrower in plan view than the gaps γ, δ, which are adjacent to the first, second and third rectangular sub-regions 15R, 15G and 15B.

If a colored part of the present embodiment is adjacent to a total of four rectangular sub-regions in the X and Y directions, the colored part is arranged adjacent to one uncolored region and three colored regions, or to two uncolored regions and two colored regions.

It is more preferable that each colored part occupies a larger area in the colored region where it is is arranged. A colored area ratio $C_i$ ($i=1, 2, 3$) in a rectangular region is defined by the following Equation (5).

Equation 2

$$C_i = \frac{A_i}{A_o} \quad (i = 1, 2, 3) \quad (5)$$

In Equation (5), $C_1$ represents a colored area ratio in the first rectangular sub-region 15R, $C_2$ represents a colored area ratio in the second rectangular sub-region 15G, and $C_3$ represents a colored area ratio in the third rectangular sub-region 15B. Further, $A_1$, $A_2$, and $A_3$ respectively represent areas of the first-, second- and third-color colored parts 17r, 17g and 17b. $A_o$ represents an area of the rectangular sub-region 15R, 15G or 15B.

In the present embodiment, if a relation $A_0 = w_x \times w_y$ is satisfied, and the shape of each colored part is rectangular in plan view, a relation $A_1 = A_2 = A_3 = L \times S$ is satisfied.

It is important that the reflective display 1 has good reproducibility of color display and is capable of displaying a bright image. If the colored area ratio $C_i$ is low, the concentration of the pigment or the thickness of the colored part may be increased for improvement of color reproducibility. This measure, however, makes the colored part less transmissive, which may lead to decreasing the amount of light used for color display and thus darkening the screen.

In this regard, a high colored area ratio $C_i$ allows decrease of pigment concentration or colored part thickness, improving the transmittance of the colored part, and achieving both high color reproducibility and brightness.

For example, the colored area ratio $C_i$ may be 80% or more, and more preferably 85% or more.

For example, if $w_x = w_y = 150$ (μm) is satisfied and the relative displacement $\Delta_e$ is 10 μm, at least 10 μm is needed as the gap γ or δ.

In this case, if each colored part is rectangular in plan view, the maximum colored area ratio $C_i$ of the colored part is $C_i = (130 \times 140/150^2) \times 100 = 81$ (%) in the above Equations (1) and (2), where α=0 (μm) and β=5 (μm). If the colored parts can have different sizes, an equation $C_3 = (150 \times 130/150^2) \times 100 = 87$ (%) can be established, where β=0 (μm), for example.

For example, if $w_x = w_y = 190$ (μm) is satisfied and the relative displacement $\Delta_e$ is 10 μm, at least 10 μm is needed as the gap γ or δ.

In this case, if each colored part is rectangular in plan view, the maximum colored area ratio $C_i$ of the colored part is $C_i = (170 \times 180/190^2) \times 100 = 85$ (%) in the above Equations (1) and (2), where α=0 (μm) and β=5 (μm). If the colored parts can have different sizes, an equation $C_3 = (190 \times 170/190^2) \times 100 = 89$ (%) can be established, where β=0 (μm), for example.

For example, if $w_x = w_y = 190$ (μm) is satisfied and the relative displacement $\Delta_e$ is 12.5 μm, at least 12.5 μm is needed as the gap γ or δ.

In this case, if each colored part is rectangular in plan view, the maximum colored area ratio $C_i$ of the colored part is $C_i = (165 \times 177.5/190^2) \times 100 = 81$ (%) in the above Equations (1) and (2), where α=0 (μm) and β=6.25 (μm). If the colored parts can have different sizes, an equation $C_3 = (165 \times 190/190^2) \times 100 = 87$ (%) can be established, where β=0 (μm), for example.

Such colored parts are formed by printing inks with colors of the respective colored parts on the ink-receiving layer 16 and solidifying the inks.

In this case, the inks are selectively applied onto the regions where the first-, second- and third-color colored parts 17r, 17g and 17b are to be respectively formed, thereby forming the color filter layer 17 without forming a black matrix. As a result, the color filter layer 17 eliminates loss of light that would be caused by the black matrix, thereby enabling the color filter layer 17 to transmit more light.

When the color filter layer 17 is formed by applying inks, an appropriate method that allows selective ink application is used.

Examples of the ink application method suitable for forming the color filter layer 17 include screen printing, offset printing, ink-jet printing, and the like. In particular, ink-jet printing is more preferable because it facilitates registration of the color filter layer 17 with the first electrode layer 11 and enhances productivity.

As an example of solidifying the inks applied to the ink-receiving layer 16, drying by heating, blowing, reduced pressure, or the like may be mentioned. For example, when the ink is an energy beam-curable ink such as a UV ink, the ink may be irradiated with UV light, or with energy beams such as electron beams. Two or more solidification methods may be combined.

If a UV ink is used, in particular, the UV ink may be directly applied to the surface of the optically transparent base material 15 without providing an ink-receiving layer 16, for formation of the color filter layer 17.

As shown in FIG. 1, the protective layer 18 is an optically transparent layer which is laminated covering the ink-receiving layer 16 and the color filter layer 17. With the color filter layer 17 being covered with the protective layer 18, the color filter layer 17 is protected. The protective layer 18 prevents the color filter layer 17 from being damaged due to mechanical contact, or becoming dirty or damp. The protective layer 18, if formed, may be included in the color filter $C_{fl}$.

The protective layer 18 may be made of an optically transparent organic resin or an optically transparent inorganic compound. Examples of the organic resin include a polyamide resin, a polyimide resin, a polyurethane resin, a polycarbonate resin, an acrylic resin, a silicone resin, and the like. Examples of the inorganic compound include $Si_3N_4$, $SiO_2$, $SiO$, $Al_2O_3$, $Ta_2O_3$, and the like.

The protective layer 18 is formed by forming the color filter layer 17, followed by applying the material mentioned above, which is further followed by solidification or vapor deposition.

Examples of the coating method of forming the protective layer 18 include spin coating, roll coating, and other appropriate printing methods.

The following description addresses inks when the color filter layer 17 is formed by inkjet printing.

The inks for forming the respective colored parts (hereinafter simply referred to as ink(s)) may each contain a colorant, a binder resin, a dispersant, or a solvent.

The colorant contained in each ink may be any generally used coloring matter, including an organic pigment, an inorganic pigment, a dye, and the like. Organic pigments are preferable as the colorant, and a highly light-resistant organic pigment is even more preferable.

The hue of the colorant is appropriately selected according to the first color, the second color, and the third color of the colored parts.

Specific examples of the pigments used as the colorants include C.I. Pigment Red 9, 19, 38, 43, 97, 122, 123, 144, 149, 166, 168, 177, 179, 180, 192, 215, 208, 216, 217, 220, 223, 224, 226, 227, 228, 240 and 254, C.I. Pigment Blue 15, 15:3, 15:6, 16, 22, 29, 60 and 64, Pigment Green 7, 36 and 58, C.I. Pigment Red 20, 24, 86, 81, 83, 93, 108, 109, 110, 117, 125, 137, 138, 139, 147, 148, 153, 154, 166, 168 and 185, C.I. Pigment Orange 36, C.I. Pigment Violet 23, C.I. Pigment Yellow 150, and the like.

To obtain a required hue, a colorant obtained by mixing two or more pigments selected from the appropriate colorant group containing these colorants may be used.

Examples of the binder resin that can be used as a material of the ink include casein, gelatin, polyvinyl alcohol, carboxymethyl acetal, a polyimide resin, an acrylic resin, an epoxy resin, a melanin resin, and the like. These are selected as appropriate in relation to the coloring matters used as colorants. For example, a binder resin such as a melamine resin, an acrylic resin, or an epoxy resin may be used as a material of the ink if the ink requires to have heat resistance or light resistance.

The binder resins may be used singly, or in combination of two or more.

The dispersant used as the ink material contributes to improving disperse of a colorant into the binder resin mentioned above. Examples of the dispersant include a nonionic surfactant, an ionic surfactant and the like.

For example, the nonionic surfactant may be polyoxyethylene alkyl ether, or the like.

Examples of the ionic surfactant include sodium alkyl benzene sulfonates, poly fatty acid salts, fatty acid salt alkyl phosphates, and tetraalkylammonium salts, and other surfactants such as organic pigment derivatives, polyesters, and the like.

A single dispersant or a combination of two or more dispersants may be contained in the ink.

Considering suitability for ink-jet printing, the solvent used for each ink may more preferably have characteristics of the surface tension being 35 mN/m or less and the boiling point being 130° C. or more.

A surface tension exceeding 35 mN/m may impair dot shape stability at the time of injection in ink-jet printing. A solvent having a boiling point of less than 130° C. may tend to dry the ink in the vicinity of the ink-jet nozzle, and thus may easily cause clogging or other defects in the nozzle.

The solvent preferably has a viscosity in the range of 5 cps or more and 20 cps or less.

For example, the solvent used for the ink may be carbitols. Specific examples of the carbitols include carbitol solvents, such as diethylene glycol monomethyl ether, diethylene glycol monoethyl ether, diethylene glycol monobutyl ether, and cellosolves thereof, and acetate compounds of carbitols.

Other examples of the solvent used as a material of each ink include gamma butyrolactone, diethylene glycol monoethyl ether acetate, butyl diglycol acetate, and the like.

The solvents mentioned above may be used as a mixture of two or more as required.

A surfactant containing at least one of a silicone-based material and a fluorine-based material may be added to each ink.

The inventor of the present invention has found that adding such a surfactant improves uniformity of color in the colored parts. The reason why uniformity of color is improved in the colored parts may be that the surface tension of the ink is lowered due to the addition of a surfactant containing at least one of the silicone-based material and the fluorine-based material, and the wet-spread of the ink is increased more when the ink is injected to the ink-receiving layer 16.

Examples of the silicone-based surfactant include a silicone resin or silicone rubber having an alkyl fluoro group, a methyl group, a phenyl group, or the like on the main chain or the side chain of a siloxane skeleton.

For example, the fluorine-based material-based surfactant may be a fluorine-containing monomer or a fluorine-containing polymer. Examples of the fluorine-containing polymer include fluororesins such as vinylidene fluoride, vinyl fluoride, ethylene trifluoride, fluorine-containing aliphatic polycarbonate, copolymers thereof, and the like.

The surfactant may have a structure in which a fluoroalkyl group containing fluorine is introduced to a chain of a silicone-based material.

The surfactant of the silicone-based material or the fluorine-based material may be added by an amount in the range of 0.01 wt % to 3.00 wt %, relative to the mass of solid content of the ink.

If the amount of addition of the surfactant is less than 0.01 wt %, only a small wet-spreading effect is exerted. If the amount of addition of the surfactant is more than 3.00 wt %, the surface tension of the ink may be excessively lowered, and thus may deteriorate injection performance of the ink-jet head.

A description will now be given of an ink-jet device used for ink-jet printing when forming the color filter layer 17 (not shown, here or later).

The ink-jet device may be of a piezo-conversion type or of a thermal-conversion type, depending on the ink injection method. The former type is more preferable.

The ink-jet device includes a loading table, (not shown, here or later) an ink-jet head (not shown, here or later), and a relative movement mechanism (not shown, here or later) that moves the loading table relative to the ink-jet head in two axial directions parallel to the loading surface.

The loading table has a surface that can be loaded with a laminate of the optically transparent base material 15 and the ink-receiving layer 16. In this laminate, at least part of the second electrode layer 14, the reflective display layer 13, and the first electrode layer 11 may be laminated or none of them may be laminated.

A description will now be given of the method of forming the color filter layer 17 using the ink-jet device.

Figure 3:
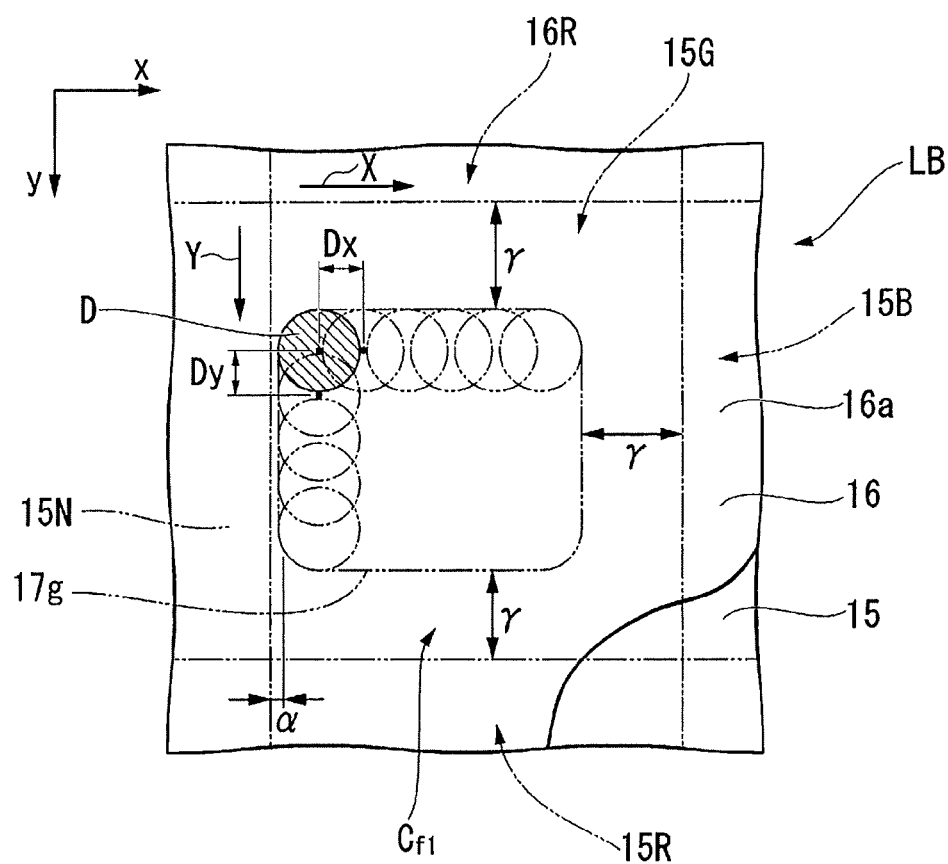
FIG. 3 is a schematic view illustrating an example of a method of forming colored parts of a color filter according to an embodiment of the present invention.

FIG. 3 is a schematic diagram illustrating an example of a method of forming the colored parts of the color filter according to an embodiment of the present invention.

FIG. 3 is an enlarged view illustrating a state in which a laminate LB of the optically transparent base material 15 and the ink-receiving layer 16 is loaded on the loading table of the ink-jet device. Since the first-, second- and third-color colored parts 17r, 17g and 17b are formed using a similar method, the forming method described below will be represented by one for the second-color colored part 17g.

The laminate LB is arranged such that the X and Y directions in which the rectangular sub-regions are arrayed respectively agree with the x and y directions in which the two axes of the relative movement mechanism of the ink-jet device move. In FIG. 3, a second rectangular sub-region 15G is shown at the center portion. In this case, the laminate LB is loaded so that the surface 16a of the ink-receiving layer 16 faces the ink-jet head (not shown).

If the laminate LB includes a first electrode layer 11, the locations of the rectangular sub-regions in terms of design are defined as regions resulting from vertically projecting the sub-pixel regions to the optically transparent base material 15. For example, an alignment mark (not shown, here or later) associated with the XY coordinates of the pixel regions and the sub-pixel regions may be formed in the laminate LB. In this case, an image of the alignment mark is read to align the laminate LB with the loading table. In the absence of an alignment mark, the laminate LB may be aligned with the loading table, for example, by reading an image of the sub-pixel electrodes through the ink-receiving layer 16 and the optically transparent base material 15.

Possible manufacturing error for the color filter layer 17 in this case may be displacement of the in ink-jet drawing position from the design value, or variation in the shape of ink dots D.

If the laminate LB does not include the first electrode layer 11, for example, the XY coordinates on the laminate LB are defined in advance based on the design value with reference to the contour of the optically transparent base material 15 or the alignment mark (not shown, here or later), or the like provided in advance to the laminate LB. In this case, an image of the contour of the optically transparent base material 15 or the alignment mark is read for alignment of the laminate LB with the loading table.

In this case as well, possible manufacturing error for the color filter layer 17 may be displacement of the in ink-jet drawing position from the design value, or variation in the shape of the ink dots D.

After loading the laminate LB on the loading table, the ink-jet head is moved by means of the relative movement mechanism, and the inks forming the colored parts are applied by ink-jet printing onto the surface 16a.

For example, when applying the ink corresponding to the second-color colored part 17g, the ink colored in the second color is injected to the surface 16a from the ink nozzle (not shown, here or later) of the ink-jet head which is supplied with the ink. When the injected ink lands on (adheres to) the ink-receiving layer 16, the ink wet-spreads over the surface 16a, forming substantially circular ink dots D. The ink that contains the surfactant mentioned above makes the diameter and the thickness of each ink dot D more stable.

If the distance from the ink nozzle to the surface 16a is 300 μm or more and 2,000 μm or less, good positional accuracy is achieved in the ink dots D. If the distance from the ink nozzle to the surface 16a is less than 300 μm, the ink-jet head and the laminate LB may come into contact with each other, depending on various error factors. If the distance from the ink nozzle to the surface 16a exceeds 2,000 μm, the injected ink is liable to fly, deflecting (misdirected).

Then, the relative movement mechanism moves the position of the ink-jet head relative to the a main scanning direction and the sub-scanning direction to fill the regions for forming the first-color colored parts 17r (hereinafter referred to as colored part-forming region(s)) with a plurality of ink dots D. The main and sub scanning directions may respectively be the x and y directions or the y and x directions.

In this case, by appropriately keeping an x-direction pitch Dx and a y-direction pitch Dy, ink layers with an even thickness and rectangular in plan view are applied to the respective colored part-forming regions.

In the present embodiment, the x direction (y direction) of the relative movement mechanism are permitted to agree with the X direction (Y direction) of the laminate LB. Thus, of the x-direction pitch Dx and the y-direction pitch Dy, the pitch in the main scanning direction is of a size for forming a band-shaped line with a constant width extending in the main scanning direction. Of the x-direction pitch Dx and y-direction pitch Dy, the pitch in the subordinate scanning direction is set such that band-shaped lines adjacent to each other in the subordinate scanning direction overlap each other with an appropriate width.

In this way, the second-color colored parts 17g are each formed into a substantially rectangular shape in plan view, with the unevenness of the contour being minimized.

In this way, the inks corresponding to the respective colored parts are applied to the respective colored part-forming regions. In this case, the inks in the colored part formation regions that are adjacent to each other in the X or Y direction do not mix with each other at the time of ink injection due to the presence of the 2·γ or γ+δ size gaps in these colored part-forming regions. When a colored part formation region is adjacent to a rectangular sub-region 15N, no ink mixing occurs because there is no colored part-forming region in the rectangular sub-region 15N. Thus, color mixing is prevented in the colored parts.

After the inks are applied to all the colored part-forming regions and respective ink layers are formed, the ink layers are solidified by a solidification method suitable for the type of the inks. The ink layers are dried, for example, by heating, blowing, reduced pressure, or the like. For example, if a UV ink is used, the ink layers are solidified by UV light radiation.

Thus, a color filter layer 17 is formed on the surface 16a of the laminate LB. Thus, the color filter $C_{fl}$ is formed.

When the laminate LB is constituted of the optically transparent base material 15 and the color filter layer 17, the color filter $C_{fl}$ formed in this way may be used as a separate color filter arranged on a suitable reflective display device or a transmissive display device.

The reflective display 1 of the present embodiment is produced by adding another configuration lacking from the reflective display 1 to such a color filter $C_{fl}$.

For example, if the color filter $C_{fl}$ only lacks the protective layer 18, the protective layer 18 is formed covering the color filter layer 17 to produce a reflective display 1. In this case, the colored parts of the color filter layer 17 are aligned with and formed in the respective rectangular sub-regions, which match the respective sub-pixel regions.

For example, if the color filter $C_{fl}$ is constituted of the optically transparent base material 15 and the color filter layer 17, the protective layer 18 is formed covering the color filter layer 17, followed by laminating the second electrode layer 14, the reflective display layer 13, the adhesive layer 12, the first electrode layer 11, and the base material 10 on the surface of the optically transparent base material 15, which is on a side opposite to the surface facing the ink-receiving layer 16.

In this case, there is no particular limitation in the order and the method of producing the laminated structure to be added to the color filter $C_{fl}$. For example, the reflective display 1 may be produced by sequentially laminating or bonding the layers on the color filter $C_{fl}$. For example, the reflective display 1 may be produced by forming a plurality of layers in advance as one or more laminates and then bonding the one or more laminates to the color filter $C_{fl}$.

If the color filter $C_{fl}$ is constituted of the optically transparent base material 15 and the color filter layer 17, there may be alignment error between the rectangular sub-regions and the respective sub-pixel regions due to an error caused when bonding the laminate including the reflective display layer 13 to the color filter $C_{fl}$. The relative displacement $\Delta_e$ described above is therefore required to be one obtained by adding the alignment error to the manufacturing error caused at the time of forming the color filter layer 17.

A description will now be given of the action of the reflective display 1 of the present embodiment with a focus on the action of the color filter layer 17.

Figure 4:
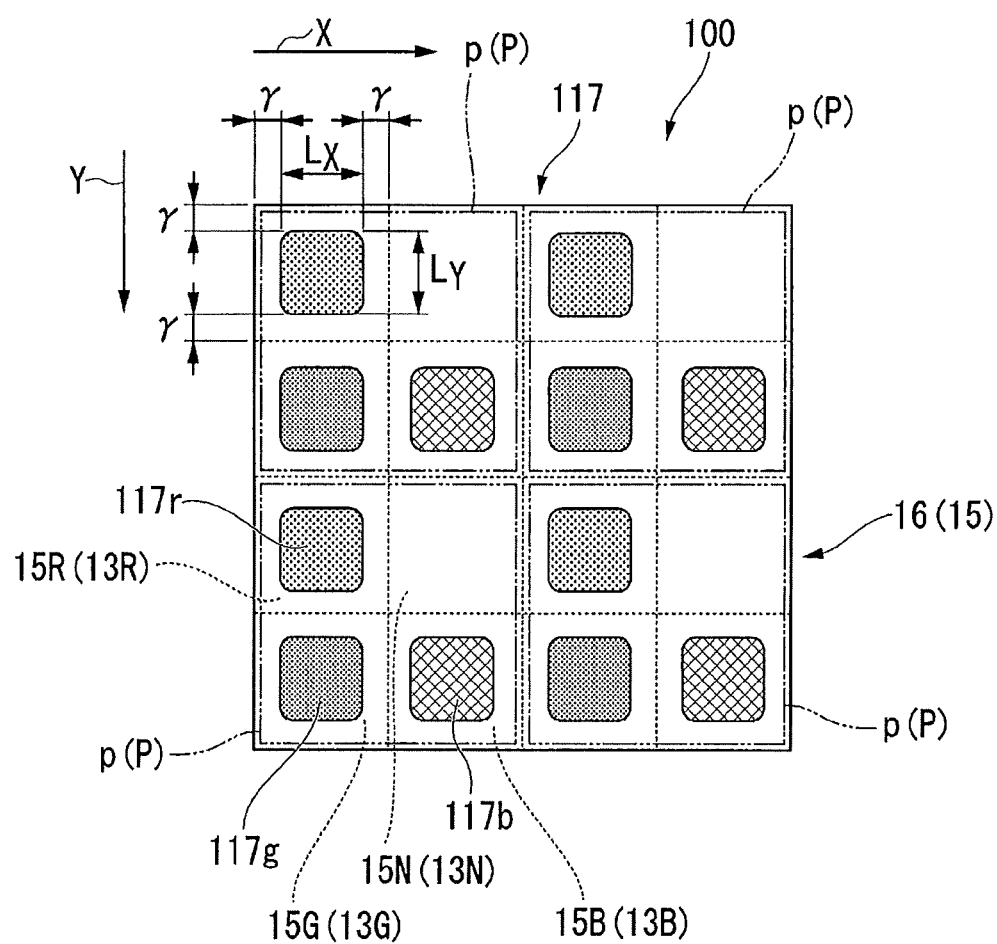
FIG. 4 is a schematic plan view illustrating an array in a color filter according to a comparative example.

FIG. 4 is a schematic plan view illustrating an array in a color filter of a comparative example.

In the reflective display 1, the reflective display layer 13 is driven when a voltage corresponding to an image signal is applied across the first and second electrode layers 11 and 14 in the pixel regions P.

In other words, in response to the voltage applied to the first-, second- and third-color sub-pixel electrodes 11r, 11g and 11b, the reflectance of the reflective display layer 13 at portions facing these sub-pixel electrodes is changed. As a result, the mode of the reflective display layer 13 is switched to display white, gray, black, or other colors in the sub-pixel regions.

Light incident on the reflective display 1 from the protective layer 18 passes through the colored parts of the colored regions, then reflected by the reflective display layer 13 in the sub-pixel regions corresponding to the respective colored parts, and is then outputted externally through the colored parts on which the light has been incident. Therefore, light of the first, second and third colors is respectively outputted, by an amount of reflection according to the image signal, from the colored regions where the first-, second- and third-color colored parts 17r, 17g and 17b are respectively arranged. As for light incident on the uncolored regions, light corresponding to the wavelength component is outputted, by an amount of reflection in the fourth sub-pixel regions 13N according to the reflectance of the reflective display layer 13.

Thus, the first, second and third colors, and the achromatic color are outputted from the pixel regions P at a ratio corresponding to the image signal. These light beams are observed as additive color mixture. Thus, the reflective display 1 is capable of color display with the pixel regions P serving as display units.

The first and second pixel regions P1 and P2 are different from each other in the arrangement of the colored parts. However, these pixel regions can perform identical color display if an identical image signal is applied thereto because the colored parts of identical color have an equal colored area ratio.

In the present embodiment, the colored parts are arranged in the respective rectangular sub-regions in plan view, with the adjacent colored parts being spaced apart from each other at least by 2·γ or γ+δ. In addition, if a colored part is adjacent to a fourth rectangular sub-region 15N in plan view, a gap α or β is formed therebetween.

The gaps γ and δ are both equal to or greater than the relative displacement $\Delta_e$ that is caused by manufacturing error. Therefore, there should be no intrusion of a colored part into a sub-pixel region for another colored part, if the colored parts are displaced in the respective rectangular sub-regions or if the sub-pixel regions are displaced from the respective rectangular sub-regions.

Hence, the first color (second color or third color) is displayed without being mixed with other colors.

Since α<γ and β<δ are satisfied, the colored parts can achieve a higher colored area ratio than when α=γ and β=δ are satisfied.

This point will be further described in comparison with the reflective display 100 of the comparative example shown in FIG. 4. The reflective display 100 includes a color filter layer 117 instead of the color filter layer 17 of the reflective display 1 of the present embodiment. The color filter layer 117 includes a first-color colored part 117r, a second-color colored part 117g, and a third-color colored part 117b, instead of the first-, second- and third-color colored parts 17r, 17g and 17b of the color filter layer 17 of the present embodiment.

In each rectangular unit region (each pixel region P) of the comparative example, the first rectangular sub-region 15R, the second rectangular sub-region 15G, the third rectangular sub-region 15B, the fourth rectangular sub-region 15N (first sub-pixel region 13R, the second sub-pixel region 13G, the third sub-pixel region 13B, the fourth sub-pixel region 13N) are arranged as in the first rectangular unit region p1 (first pixel region P1) of the present embodiment.

Therefore, the array pattern of the first-, second- and third-color colored parts 117r, 117g and 117b is identical between the rectangular unit regions p.

In the following description, the first-, second- and third-color colored parts 117r, 117g and 117b may be collectively referred to as colored parts of the comparative example.

In such a color filter layer 117, the colored parts of the comparative example have an adjacency relationship in plan view as set forth below.

The first-color colored part 117r is sandwiched between two fourth rectangular sub-regions 15N in the X direction and is adjacent to two second-color colored parts 117g in the Y direction.

The second-color colored part 117g is adjacent to two third-color colored parts 117b in the X direction and to two first-color colored parts 117r in the Y direction. In other words, the second-color colored part 117g is surrounded by other colored parts in the X and Y directions.

The third-color colored part 117b is adjacent to two second-color colored parts 117g in the X direction, and sandwiched between two fourth rectangular sub-regions 15N in the Y direction.

In the color filter layer 117 in the comparative example, each second-color colored part 117g is surrounded by other colored parts and thus a gap γ is required to be formed between the second-color colored part 117g and each of the boundaries of the second sub-pixel region 13G. The firstand third-color colored parts 117r and 117b are shaped identically with the second-color colored part 117g.

In other words, each colored part of the comparative example is in a rectangular shape having a width of $L_X=w_X-2\cdot\gamma$ in the X direction and a width of $L_Y$ $w_Y-2\cdot\gamma$ in the Y direction.

As a result, each colored part of the comparative example has an area smaller than each of the colored parts of the present embodiment, and accordingly has a smaller colored area ratio.

For example, when $w_x=w_y=150$ (μm) and $\gamma=10$ (μm) are satisfied, and the colored parts are each rectangular in plan view, the colored area ratio $C_i$ of the colored parts is $C_i=(130^2/150^2)\times100=75$ (%). The numerical value of the colored area ratio of the comparative example is considerably lower than the numerical value $C_i=81$ (%) of the present embodiment described above.

As can be seen from the comparison with the comparative example, the reason why the colored area ratio can be improved in the present embodiment is that the gap in each colored part at the boundary with the adjacent uncolored region is reduced to 0 μm and the colored part is extended toward the uncolored region. In the present embodiment, such an arrangement of the colored parts is achieved by the fact that each colored part is adjacent to at least one uncolored region in either the X or Y direction.

A description will now be given of a relationship between colored area ratio and color reproducibility.

Figure 5:
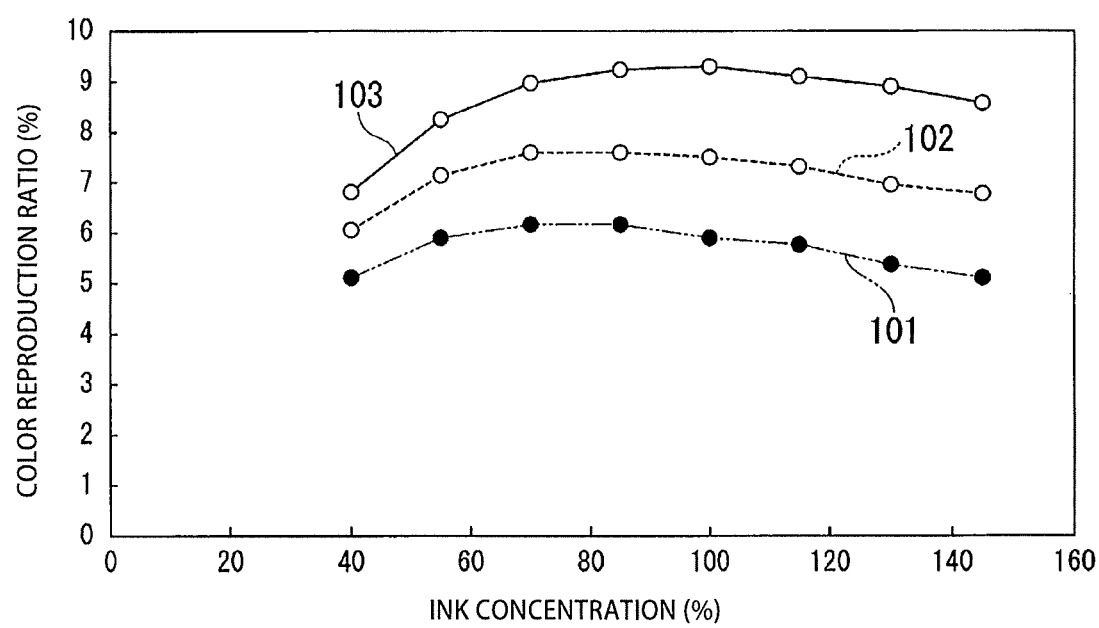
FIG. 5 is a graph illustrating a relationship between ink concentration and color reproducibility with colored area ratio being varied.

FIG. 5 is a graph illustrating a relationship between ink concentration and color reproduction ratio when colored area ratio is varied. In FIG. 5, the horizontal axis indicates ink concentration (%), and the vertical axis indicates color reproduction ratio (%), both of which will be described later.

To investigate a relationship between colored area ratio and color reproducibility, the inventor of the present invention prepared color filters $C_{f1}$ with varied ink concentration and colored area ratios, and measured color reproduction ratio in a reflective display to which these color filters are mounted. The first, second and third colors were red, blue, and green, respectively.

In this experimental example, a plurality of color filters were prepared with different colored area ratios $C_i$ of colored parts. In this case, in one color filter, the colored area ratio $C_i$ was equal between the colored parts. The colored area ratios $C_i$ were 70% (indicated by the curve 101 in FIG. 5), 75% (indicated by the curve 102 in FIGS. 5), and 80% (indicated by the curve 103 in FIG. 5). To render the colored area ratio $C_i$ to be 80%, $w_X=w_Y=190$ (μm) was assumed.

The ink concentration indicates a pigment concentration in an ink that forms each colored part. The ink concentration in FIG. 5, however, is indicated by a relative value where a 4% pigment weight ratio in the ink is taken to be 100%. Eight ink concentrations taken from every 15% in the range of 40% to 145% were used.

The color reproduction ratio was represented by an NTSC ratio. The NTSC ratio was measured with spectroscopic colorimeter CM-700d (manufactured by Konica Minolta Optics Co., Ltd.).

As indicated by the curves 101, 102 and 103 of FIG. 5, the higher the colored area ratio was, the better the color reproduction ratio became, at any ink concentration.

The relationship between pigment concentration and color reproduction ratio was depicted as a gentle convex curve for all the colored area ratios, with a result that pigment concentration did not contribute much to color reproduction ratio. As the colored area ratio became higher, the color reproduction ratio was more liable to change depending on the pigment concentration, but the change was small. The maximum color reproduction ratios were 5.9% for the 70% colored area ratio, 7.4% for the 75% colored area ratio, and 9.3% for the 80% colored area ratio. These results indicate that change of colored area ratio from 70% to 75% improves color reproduction ratio by a factor of about 1.3, and change of colored area ratio from 70% to 80% improves by a factor of about 1.6.

It will be understood that improvement of the colored area ratio $C_i$ improves the color reproduction ratio of the reflective display 1.

As described above, the color filter layer 17 constituting the color filter of the present embodiment has a configuration in which rectangular unit regions are arrayed in two directions orthogonal to each other. In this configuration, each rectangular unit region includes a 2×2 lattice array of rectangular sub-regions, with colored parts being respectively arranged in three of the sub-regions and no colored part being arranged in one of the sub-regions.

In such a configuration, the color filter of the present embodiment creates an adjacency relationship in which each colored filter is adjacent to at least one uncolored region in either the X or Y direction. Therefore, each colored part, by minimizing the gap at the boundary with the adjacent uncolored region to 0 μm, can be extended toward the uncolored region. As a result of this extension, the area ratio (colored area ratio) of each colored part to the rectangular sub-region can be improved.

Thus, the reflective display 1 of the present embodiment, which includes the color filter of the present embodiment, can improve color reproducibility.

Modifications

Modifications of the color filter of the embodiment set forth above will be described.

Figure 6:
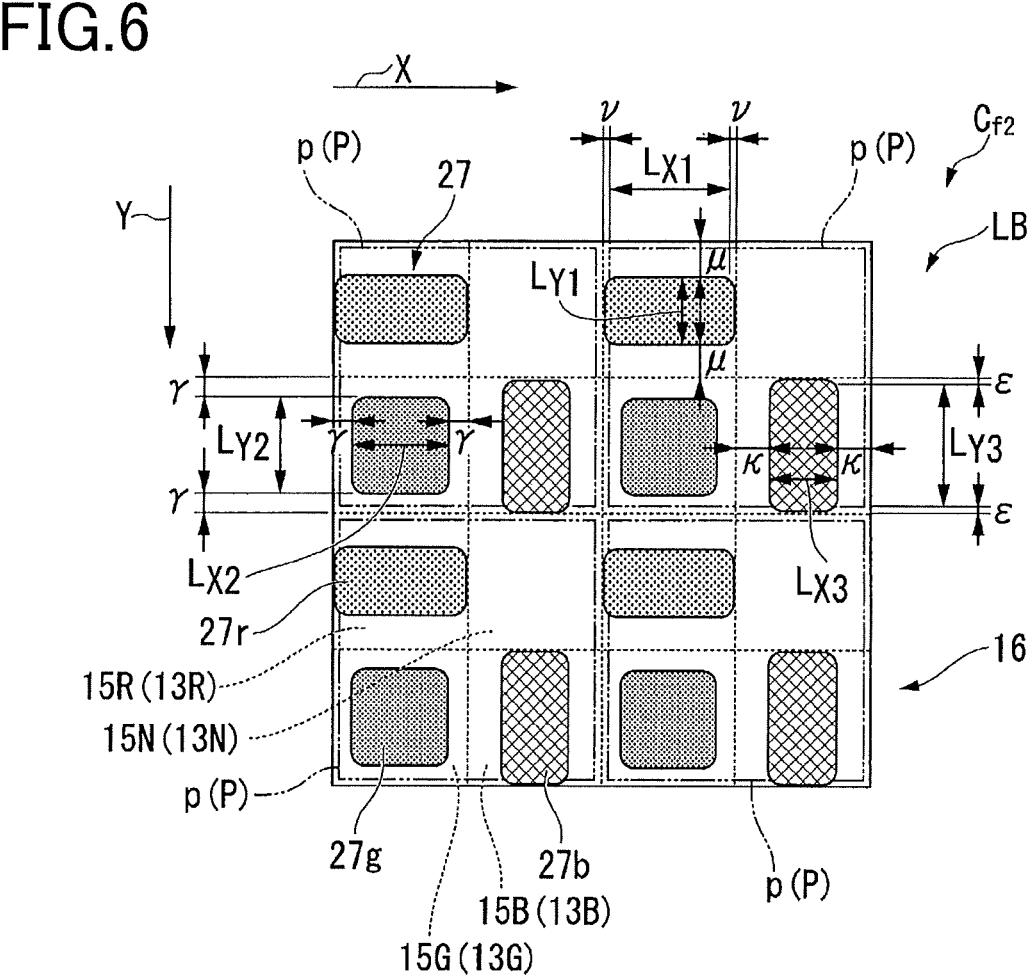
FIG. 6 is a schematic plan view illustrating an array of colored parts of a color filter according to a modification of an embodiment of the present invention.

FIG. 6 is a schematic plan view illustrating an array of colored parts in a color filter as a modification of the embodiment of the present invention.

As shown in FIG. 6, a color filter $C_{f2}$ of the present modification includes a color filter layer 27 instead of the color filter layer 17 in the color filter $C_{f1}$ of the embodiment described above.

In the reflective display 1 of the embodiment described above, the color filter $C_{f2}$ can be used instead of the color filter $C_{f1}$. The following description will be focused on the differences from the above embodiment.

In the above embodiment, the color filter $C_{f1}$ is described as an example in which all the colored parts, which are each adjacent to a total of four rectangular sub-regions in the X and Y directions, are each adjacent to at least one uncolored region.

In this regard, the color filter $C_{f2}$ of the present modification is provided as an example in which one of the three colored parts in each pixel region P is not adjacent to an uncolored region.

The color filter layer 27 includes a first-color colored part 27r (colored part), a second-color colored part 27g (colored part), a third-color colored part 27b (colored part), instead of the first-, second- and third-colored parts 17r, 17g and 17b of the color filter layer 17 of the above embodiment. It should be noted that the array pattern of the first-, second- and third-color colored parts 27r, 27g and 27b in the respective rectangular regions on the ink-receiving layer 16 facing the pixel regions P is similar to or the same as that of the comparative example described above.

In the following description, the first-, second- and third-color colored parts 27r, 27g and 27b may be collectively referred to as colored parts.

In each rectangular unit region (each pixel region P) of the present modification, the first rectangular sub-region 15R, the second rectangular sub-region 15G, the third rectangular sub-region 15B, the fourth rectangular sub-region 15N (first sub-pixel region 13R, the second sub-pixel region 13G, the third sub-pixel region 13B, the fourth sub-pixel region 13N) are arranged as in the first rectangular unit region p1 (first pixel region P1) of the embodiment described above.

In such a color filter layer 27, the colored parts have an adjacency relationship in plan view as set forth below.

The first-color colored part 27r is sandwiched between two fourth rectangular sub-regions 15N in the X direction and is adjacent to two second-color colored parts 27g in the Y direction.

The second-color colored part 27g is adjacent to two third-color colored parts 27b in the X direction and to two first-color colored parts 27r in the Y direction. In other words, the second-color colored part 27g is surrounded by other colored parts in the X and Y directions.

The third-color colored part 27b is adjacent to two second-color colored parts 27g in the X direction, and sandwiched between two fourth rectangular sub-regions 15N in the Y direction.

Since the second-color colored part 27g is surrounded by other colored parts in the X and Y directions, gaps γ are formed in the second rectangular sub-region 15G so as to each be located between the second-color colored part 27g and the respective boundaries.

Since the first-color colored part 27r is sandwiched between second-color colored parts 27g in the Y direction, gaps μ (second gaps) are formed in the first rectangular sub-region 15R so as to each be located between the third-color colored part 27b and the boundary at a Y-direction end. Since the third-color colored part 27b is sandwiched between second-color colored parts 27g in the X direction, gaps κ (second gaps) are formed in the third rectangular sub-region 15B so as to each be located between the first-color colored part 27r and the boundary at an X-direction end.

The gap μ (or κ) refers to a gap with a size of μ (or κ) in relation to a boundary. To prevent colors of displayed light from being mixed, the size of the gap μ (or κ) is determined, similarly to the gap γ, so that the colored part does not cross over the boundaries even when manufacturing variation is considered. The gaps μ and κ may both take an appropriate value of not less than that of the gap γ.

Since the first-color colored part 27r is sandwiched between fourth rectangular sub-regions 15N in the X direction, gaps ν (first gaps) are formed in the first rectangular sub-region 15R so as to each be located between the first-color colored part 27r and the boundary at an X-direction end. Since the third-color colored part 27b is sandwiched between fourth rectangular sub-regions 15N in the Y direction, gaps s (first gaps) are formed in the third rectangular sub-region 15B so as to each be located between the third-color colored part 27b and the boundary at a Y-direction end. The gap ν (or ε) refers to a gap with a size of ν (or ε) in relation to the first-color colored part 27r (or third-color colored part 27b) and a boundary. The gap ν satisfies 0≤ν<μ, and the gap c satisfies 0≤ε<κ. That is, the gaps ν or ε can be 0.

When the widths in the X direction of the first-, second- and third-color colored parts 17r, 17g and 17b are respectively $L_{X1}$, $L_{X2}$, and $L_{X3}$, and the widths in the Y direction are respectively $L_{Y1}$, $L_{Y2}$, and $L_{Y3}$, each width is expressed by the following Equations (6) to (11).

Equation 3

$$L_{X1} = w_x - 2 \cdot \nu \quad (6)$$

$$L_{Y1} = w_y - 2 \cdot \mu \quad (7)$$

$$L_{X2} = w_x - 2 \cdot \gamma \quad (8)$$

$$L_{Y2} = w_y - 2 \cdot \gamma \quad (9)$$

$$L_{X3} = w_x - 2 \cdot \kappa \quad (10)$$

$$L_{X3} = w_y - 2 \cdot \varepsilon \quad (11)$$

Such a configuration can create a condition of causing no color mixing between colored parts, while making the colored area ratios $C_1$ and $C_3$ in the first and third sub-pixel regions 13R and 13B larger than the colored area ratio $C_2$ in the second sub-pixel region 13G. Thus, color reproducibility of the first and third colors can be improved by only controlling the colored area ratio.

The second color is inferior in color reproducibility to the first and third colors because the colored area ratio $C_2$ is relatively lower than those of the first and third colors. However, since two of the three colors are improved in color reproducibility, full color reproducibility in general is improved.

If the colored area ratio of the second color can be compensated by, for example, setting pigment concentration to an appropriate value, the three colors can be kept well balanced.

The embodiments set forth above have each been given by way of an example in which the color filter is applied to a reflective display device. Therefore, the rectangular unit regions and the rectangular sub-regions in the color filter are clearly defined by the sizes of the pixel regions and the sub-pixel regions in the reflective display device, respectively.

The positions and the sizes of rectangular unit regions and rectangular sub-regions as a separate color filter are prescribed by the color filter specification.

If such a color filter specification is unclear, however, the following steps can be taken to determine whether the color filter corresponds to the configuration according to an embodiment of the present invention.

Firstly, an image of the surface of the color filter is acquired to specify the boundaries in two directions for defining rectangular unit regions each including three colored parts, i.e. the boundaries along which the entire color filter can be evenly divided. The boundaries between the rectangular unit regions, each of which can be at any position within the range of gaps between adjacent colored parts, are selected such that the gaps between colored parts in adjacent rectangular unit regions are evenly distributed on average. Secondly, each of the rectangular unit regions specified in this way is evenly divided into four to determine the boundaries defining the rectangular sub-regions. Finally, the gaps, each being present between a boundary of the rectangular sub-region and the contour of the colored part, are measured on the image of the surface of the color filter to determine whether the relationship between the gaps satisfies the gap range as in an embodiment of the present invention.

The embodiment set forth above has been given by way of an example in which the colored parts have an identical shape in plan view, but as long as the colored area ratios are equal to each other, the colored parts do not necessarily have to have an identical contour in plan view.

The above embodiment and modifications have each been described by way of an example in which the protective layer 18 is formed by applying a transparent material, followed by solidification or vapor deposition.

The protective layer 18, however, may be constituted by an optically transparent sheet base material. For example, this protective layer 18 may be produced as follows.

Specifically, a color filter layer 17 is arranged on a sheet base material to produce a color filter. In this case, an ink-receiving layer 16 may be formed on the surface of the sheet base material on which the color filter layer 17 has been formed.

A base material 10, a first electrode layer 11, a reflective display layer 13, a second electrode layer 14, and an optically transparent base material 15 are produced in advance as a laminate that is separate from the color filter.

A reflective display is produced by bonding the above color filter, or by bonding the color filter layer 17 to the optically transparent base material 15 of this laminate, with an appropriate transparent adhesive being interposed therebetween.

In this case, the sheet base material serves as a substrate for the color filter, and also as a protective layer 18 of the reflective display.

EXAMPLES

The color filter of the above embodiment will be described below through Examples 1 to 3 of and Comparative Examples 1 and 2. Table 1 below shows major production conditions for Examples 1 to 3 and Comparative Examples 1 and 2, and evaluations.

Then, a first electrode layer 11 made of an amorphous silicon alloy as semiconductors and an aluminum-titanium alloy as wiring lines was formed on a base material 10 made of glass. A reflective display layer 13 was bonded onto the first electrode layer 11 via an adhesive layer 12 formed of an acrylic adhesive.

The reflectance of the reflective display layer 13 was measured under conditions of a two-degree field of view and a D65 light source by means of a spectral colorimeter CM-700d (manufactured by Konica Minolta Optics Co., Ltd.). The measurements yielded a white reflectance of 44.2% when a white color was displayed and a black reflectance of 2.0% when a black color was displayed.

A coating liquid for forming an ink-receiving layer 16 was applied onto the optically transparent base material 15 of this state by means of a die coater, followed by drying, thereby forming an ink-receiving layer 16 with an average thickness of 8 μm. As the coating liquid for forming the ink-receiving layer 16, a mixture of a urethane resin, toluene, water, and IPA was used. For the drying, a vacuum dryer was used.

The first electrode layer 11 was formed so that each pixel region would have a width of 150 μm in the X direction and a width of 150 μm in the Y direction in each first pixel region P1 or second pixel region P2.

In the present example, a red (R) ink, a green (G) ink, and a blue (B) ink were respectively used as a first color, as a second color, and as a third color, for forming a color filter layer 17.

TABLE 1

| | Sub-pixel (μm) | Colored part (μm) | Gap (μm) α | γ | β | δ | Colored area ratio (%) | White reflectance (%) | Color | L* | a* | b* | Y | NTSC ratio (%) |
|---|---|---|---|---|---|---|---|---|---|---|---|---|---|---|
| Example 1 | 150 × 150 | 140 × 130 | 0 | 10 | 5 | 10 | 81 | 17.4 | Red | 17.6 | 13.6 | 6.7 | 2.4 | 9.9 |
| | | | | | | | | | Green | 22.3 | −18.5 | 10.8 | 3.6 | |
| | | | | | | | | | Blue | 15.2 | 2.8 | −15.5 | 1.9 | |
| Example 2 | 190 × 190 | 177.5 × 165 | 0 | 12.5 | 6.25 | 12.5 | 81 | 18.0 | Red | 18.2 | 13.3 | 6.5 | 2.6 | 9.7 |
| | | | | | | | | | Green | 22.5 | −19.2 | 11.2 | 3.7 | |
| | | | | | | | | | Blue | 15.6 | 3.0 | −15.2 | 2.0 | |
| Example 3 | 190 × 190 | 180 × 170 | 0 | 10 | 5 | 10 | 85 | 17.1 | Red | 17.4 | 14.2 | 7.0 | 2.4 | 11.3 |
| | | | | | | | | | Green | 22.0 | −20.0 | 11.8 | 3.5 | |
| | | | | | | | | | Blue | 14.6 | 3.4 | −16.1 | 1.8 | |
| Comparative Example 1 | 150 × 150 | 130 × 130 | (10) | 10 | (10) | (10) | 75 | 18.8 | Red | 18.9 | 12.3 | 6.0 | 2.7 | 7.1 |
| | | | | | | | | | Green | 23.2 | −17.3 | 10.0 | 3.9 | |
| | | | | | | | | | Blue | 18.3 | 2.1 | −12.9 | 2.6 | |
| Comparative Example 2 | 190 × 190 | 165 × 165 | (12.5) | 12.5 | (12.5) | (12.5) | 75 | 19.4 | Red | 19.4 | 11.9 | 5.6 | 2.8 | 7.5 |
| | | | | | | | | | Green | 23.4 | −17.7 | 10.3 | 3.9 | |
| | | | | | | | | | Blue | 17.0 | 2.4 | −14.0 | 2.3 | |

Example 1

As shown in Table 1, Example 1 is an example of a reflective display 1 provided with the color filter $C_{f1}$ of the above embodiment, wherein each sub-pixel has a size of 150 μm×150 μm, each colored part has a width of 140 μm×130 μm, and gaps α, γ, β and δ respectively have widths of 0 μm, 10 μm, 5 μm, and 10 μm.

Example 1 of the reflective display 1 was produced as follows.

A second electrode layer 14 made of indium tin oxide (ITO) and a reflective display layer 13 made of an electrophoretic display medium were laminated in this order on an optically transparent base material 15 made of PET, thereby forming a first laminate.

In other words, the R ink (G ink, B ink) for ink-jet printing was produced by mixing an R (G, B) pigment with a mixture of a binder resin, a dispersant, and a solvent.

These inks were applied onto the ink-receiving layer 16 by means of an ink-jet printer to produce a pattern of the first-color colored part 17r, the second-color colored part 17g, and the third-color colored part 17b.

As the ink-jet printer, one equipped with an ink-jet head of 12 pl, 180 dpi (180 dots per 2.54 cm) manufactured by Seiko Instruments, Inc., was used.

The applied inks were dried for 5 minutes by means of a vacuum dryer. Thus, a color filter layer 17 was formed.

Colored parts were each formed into a substantially rectangular shape. Each colored part had widths of L=140 (μm) and S=130 (μm). Gaps between the colored parts and the boundaries with respective rectangular sub-regions were α=0 (μm), γ=10 (μm), β=5 (μm), and δ=10 (μm).

Colored area ratios $C_1$, $C_2$, and $C_3$ were all 81 (%).

Then, a protective layer 18 made of a PET film was laminated on the color filter layer 17.

Thus, a reflective display 1 of Example 1 of the above embodiment was produced.

Example 2

As shown in Table 1, a reflective display of Example 2 was produced as in Example 1 except that each subpixel had a size of 190 μm×190 μm, each colored part had a width of 177.5 μm×165 μm, and gaps α, γ, β, and δ respectively had widths of 0 μm, 12.5 μm, 6.25 μm, and 12.5 μm. Colored area ratios $C_1$, $C_2$, and $C_3$ were therefore all 81 (%).

Example 3

As shown in Table 1, a reflective display of Example 3 was produced as in Example 1 except that each subpixel had a size of 190 μm×190 μm, each colored part had a width of 180 μm×170 μm, and gaps α, γ, β, and δ respectively had widths of 0 μm, 10 μm, 5 μm, and 10 μm. Colored area ratios $C_1$, $C_2$, and $C_3$ were therefore all 85 (%).

Comparative Examples 1 and 2

Comparative Examples 1 and 2 are examples of reflective displays 100 in which each sub-pixel has a size of 150 μm×150 μm and 190 μm×190 μm, respectively.

Comparative Examples 1 and 2 were produced as in Example 1 except that the array pattern of the colored parts and the contour in plan view of each colored part were different.

In Comparative Example 1, each colored part had widths of $L_X$=130 (μm) and $L_Y$=130 (μm). Accordingly, the gap in Comparative Example 1 was γ=10 (μm) as in Example 1. Colored area ratios $C_1$, $C_2$, and $C_3$ were all 75%.

In Comparative Example 2, each colored part had a width of $L_X$=165 (μm) and $L_Y$=165 (μm). Accordingly, the gap in Comparative Example 2 was 12.5 (μm) wide as in Example 2. Colored area ratios $C_1$, $C_2$, and $C_3$ were all 75%.

<Evaluation>

The reflective displays of Examples 1 to 3 and Comparative Examples 1 and 2 were evaluated in terms of white reflectance and color reproducibility. The evaluations were conducted under conditions of a two-degree field of view and a D65 light source, using a spectroscopic colorimeter CM-700d (manufactured by Konica Minolta Optics Co., Ltd.).

Table 1 above shows evaluations of Examples 1 to 3 and Comparative Examples 1 and 2.

White reflectance was measured while the sub-pixel electrodes of the first electrode layer were driven to develop white color. As shown in Table 1, measurements of white reflectance of Examples 1 to 3 and Comparative Example 1 and 2 were 17.4%, 18.0%, 17.1%, 18.8%, and 19.4%, respectively.

In other words, higher colored area ratio tended to provide lower white reflectance, but the tendency was not strong. Since the white reflectance required by reflective display devices is 15% or more, all the measurements of white reflectance were good.

When evaluating color reproducibility, the NTSC ratio was determined based on spectral measurement of red, green, and blue displayed by individually driving the sub-pixel electrodes for displaying the first, second and third colors. Table 1 shows measurements of L*, a*, b*, and Y of the displayed colors, and NTSC ratios. L*, a*, b* are values of an L*-coordinate, an a*-coordinate, and a b*-coordinate, respectively, in the L*a*b* color space, and Y is a value of a Y-coordinate in the XYZ color space.

As shown in Table 1, measurements of NTSC ratio indicating color reproducibility in Examples 1 to 3 and Comparative Example 1 and 2 were 9.9%, 9.7%, 11.3%, 7.1%, and 7.5%, respectively.

Thus, Examples 1 to 3 show colored area ratios higher than those of Comparative Examples 1 and 2 and improved color reproducibility. Specifically, in Example 1, colored area ratio was improved by 6% compared to Comparative Example 1, so that NTSC ratio was improved to about 1.4 times. Similarly, in Example 2, where the sub-pixel size was different, colored area ratio was improved by 6% compared to Comparative Example 2, so that NTSC ratio was improved to about 1.3 times. In Example 3, colored area ratio was improved by 10% compared to Comparative Example 2, so that NTSC ratio was improved to about 1.5 times.

This application addresses the following: the conventional color filters or reflective display devices as set forth above raise the following issues.

The reflective display devices described in PTLs 1 and 2 each include a color filter registered with a reflective display layer. The color filter includes pixel regions on the transparent substrate to serve as color-display units with three colored parts corresponding to three primary colors being arranged in each of the units. The reflective display layer is capable of switching a display mode between white and black in conformity with the colored parts.

The reflective display layer includes a predetermined number of rectangular drive electrodes which are arranged in a rectangular lattice pattern. In each pixel region, four drive electrodes are arrayed in a 2×2 lattice pattern. These four drive electrodes independently switch the display mode between white and black in the sub-pixel regions (regions formed by dividing a pixel region into four) of each reflective display unit.

The colored parts are each in a rectangular shape in plan view and are respectively arrayed in the sub-pixel regions of three drive electrodes. The center of each colored part aligns with the center of the corresponding sub-pixel region. On the remaining drive electrode of the pixel region, a sub-pixel region not provided with a colored part is arranged.

The ratio of the area of a colored part to the area of the sub-pixel region facing the colored part is referred to as a colored area ratio. A higher colored area ratio ensures better color reproducibility.

In the configuration of the colored parts described above, however, a higher colored area ratio makes the gap between adjacent colored parts smaller. As a result, the colored parts are apt to be partially mixed with each other in the process of fabricating the color filter, easily causing color mixing of the colored parts. For example, in a color filter used for a transmissive liquid crystal display, a light-shielding member such as a black matrix is provided between colored parts to prevent color mixing of the colored parts. However, it is difficult to use such a black matrix in a reflective display device because it lowers the efficiency of extracting reflected light.

In addition, manufacturing error, if any, may lead to misalignment between the colored parts and the respective sub-pixel regions. In this case, in spite of the gaps being formed between colored parts, there may be a colored part that is arranged on a sub-pixel region where another colored part is arranged, thereby causing unexpected color mixing of display light during color display.

Therefore, gaps that allow the colored parts to be kept apart from sub-pixel regions of other colored parts need to be provided between adjacent colored parts of the color filter used for a reflective display device to prevent color mixing, even if misalignment occurs between the colored parts and the sub-pixel regions due to manufacturing error.

Thus, a color filter that uses no black matrix needs gaps between the colored parts. Therefore, a color filter that uses no black matrix poses an issue of unavoidably lowering colored area ratio and accordingly lowering color reproducibility if resolution of color display is attempted to be enhanced.

The present invention has an aspect to provide a color filter that minimizes the occurrence of color mixing and improves area ratio of the colored parts in a filter configuration including rectangular unit regions arrayed in two directions orthogonal to each other, in each of which the rectangular sub-regions are arranged in a 2×2 lattice array pattern, with colored parts being respectively arranged in three rectangular sub-regions and no colored part being arranged in one rectangular sub-region.

The present invention has another aspect to provide a reflective display device that can improve color reproducibility by provision of the color filter according to an aspect of the present invention.

To solve the above issue, a color filter of a first aspect of the present invention includes a substrate that transmits visible light and a plurality of colored parts that are arranged on the substrate and transmit non-white light. When rectangular regions formed by evenly dividing a surface of the substrate along a first direction and a second direction orthogonal to the first direction are referred to as rectangular unit regions, and four rectangular regions formed by evenly dividing each of the rectangular unit regions into two along the first direction and into two along the second direction are referred to as rectangular sub-regions, three regions of the rectangular sub-regions in each of the rectangular unit regions serve as colored regions in which the colored parts are respectively arranged, and one region of the rectangular sub-regions in each of the rectangular unit regions excluding the three rectangular sub-regions serves as an uncolored region in which none of the colored parts is arranged. Of the plurality of colored parts, a first colored part arranged in a first-color colored region adjacent to the uncolored region in the first direction or the second direction is so arranged that a first gap is narrower than a second gap, the first gap being formed between the first colored part and a boundary of the first-color colored region with the uncolored region, the second gap being formed between the first colored part and a boundary of the first-color colored region with a second uncolored region adjacent to the first-color colored region in the second direction or the first direction.

In a color filter of a second aspect of the present invention according to the color filter of the first aspect, when the plurality of colored parts are each adjacent to a total of four rectangular sub-regions in the first direction and the second direction, the plurality of colored parts are each so arranged as to be adjacent to one uncolored region and three colored regions, or adjacent to two uncolored regions and two colored regions.

In color filter of a third aspect of the present invention according to the color filter of the first or second aspect, the plurality of colored parts include a plurality of first-color colored parts that transmit light of a first color, a plurality of second-color colored parts that transmit light of a second color different from the first color, and a plurality of third-color colored parts that transmit light of a third color different from the first color and the second color. Furthermore, the first-color colored part, the second-color colored part, and the third-color colored part are respectively arranged in the three regions of the rectangular sub-regions in each of the rectangular unit regions.

In a color filter of a fourth aspect of the present invention according to any one of the first to third aspects, area ratios of the respective colored parts in the respective rectangular sub-regions in each of the rectangular unit regions are equal to each other.

In a color filter of a fifth aspect of the present invention according to the fourth aspect, the area ratios are each 80% or more.

A reflective display device of a sixth aspect of the present invention includes the color filter according to any one of the first to fifth aspects, and a plurality of reflective display layers respectively arranged facing the rectangular sub-regions of the color filter and capable of independently changing reflectance.

The color filter according to an aspect of the present invention exerts an effect of minimizing the occurrence of color mixing and improving area ratio of the colored parts in a filter configuration including rectangular unit regions arrayed in two directions orthogonal to each other, in each of which the rectangular sub-regions are arranged in a 2×2 lattice array pattern, with colored parts being respectively arranged in three rectangular sub-regions and no colored part being arranged in one rectangular sub-region.

The reflective display device according to an embodiment of the present invention includes the color filter being an aspect of the present invention, thereby exerting an effect of improving color reproducibility.

Preferred embodiments and modifications of the present invention have so far been described along with examples. However, the present invention should not be limited to these embodiments, modifications, and examples. Addition, omission, replacement, and other modifications of the configuration may be made without departing from the spirit of the present invention.

The present invention should not be limited by the description provided above but should be limited only by the appended claims.

Reference Signs List

1 . . . Reflective display (Reflective display device)
10 . . . Base material
11 . . . First electrode layer
11$r$ . . . First-color sub-pixel electrode
11$g$ . . . Second-color sub-pixel electrode
11$b$ . . . Third-color sub-pixel electrode
11$n$ . . . Achromatic sub-pixel electrode
13 . . . Reflective display layer
13$a$, 15$a$, 16$a$ . . . Surface
13R . . . First sub-pixel region
13G . . . Second sub-pixel region
13B . . . Third sub-pixel region
13N . . . Fourth sub-pixel region
14 . . . Second electrode layer
15 . . . Optically transparent base material (substrate)
15R . . . First Rectangular sub-region (colored region)
15G . . . Second rectangular sub-region (colored region)
15B . . . Third rectangular sub-region (colored region)
15N . . . Fourth rectangular sub-region (uncolored region)
16 . . . Ink-receiving layer 17, 27 . . . Color filter layer
17r, 27r . . . First-color colored part (colored part)
17g, 27g . . . Second-color colored part (colored part)
17b, 27b . . . Third-color colored part (colored part)
18 . . . Protective layer
$C_{fi}$ . . . Color filter
$C_i$, $C_1$, $C_2$, $C_3$ . . . Colored area ratio
P . . . Pixel region
P1 . . . First pixel region
P1 . . . Second pixel region
p1, p2 . . . Rectangular unit region
α, β, ν, ε . . . Gap (First gap)
γ, δ, μ, κ . . . Gap (Second gap)

Obviously, numerous modifications and variations of the present invention are possible in light of the above teachings. It is therefore to be understood that within the scope of the appended claims, the invention may be practiced otherwise than as specifically described herein.

What is claimed is:

1. A color filter, comprising:
a substrate configured to transmit visible light and having a surface having rectangular unit regions defined by evenly dividing the surface along a first direction and a second direction orthogonal to the first direction; and
a plurality of colored parts formed on the substrate and configured to transmit non-white light such that the plurality of colored parts includes a plurality of first-color colored parts, a plurality of second-color colored parts and a plurality of third-color colored parts,
wherein each of the rectangular unit regions has four rectangular sub-regions defined by evenly dividing each of the rectangular unit regions into two along the first direction and two along the second direction, the four rectangular sub-regions in each of the rectangular unit regions are three colored regions in which the colored parts are respectively formed and one uncolored region in which none of the colored parts is formed, the three colored regions include a first colored region, a second colored region and a third colored region such that the first colored region has a first boundary with the uncolored region and a second boundary with the second colored region and that the third colored region has the first boundary with the second colored region and the second boundary with the uncolored region, each of the first-color colored parts is formed in the first colored region and has a first gap formed in the first direction between the first boundary and a side of the first-color colored part facing the first boundary and a second gap formed in the second direction between the second boundary and a side of the first-color colored part facing the second boundary such that the second gap is greater than the first gap, and each of the third-color colored parts is formed in the third colored region and has a first gap formed in the second direction between the second boundary and a side of the third-color colored part facing the second boundary and a second gap formed in the first direction between the first boundary and a side of the third-color colored part facing the first boundary such that the second gap of the third-color colored part is greater than the first gap of the third-color colored part.

2. The color filter of claim 1, wherein each of the colored parts is adjacent to a total of four rectangular sub-regions in the first and second directions, which are one uncolored region and three colored regions, or two uncolored regions and two colored regions.

3. A reflective display device, comprising:
the color filter of claim 2; and
a plurality of reflective display layers respectively positioned facing the rectangular sub-regions of the color filter and configured to change reflectance independently.

4. The color filter of claim 2, wherein the rectangular sub-regions in each of the rectangular regions of the substrate are formed such that a plurality of sub-pixel electrodes in a reflective display device are formed in conformity with positions of the rectangular sub-regions respectively in each of the rectangular regions of the substrate, the plurality of first-color colored parts are configured to transmit light of a first color, the plurality of second-color colored parts are configured to transmit light of a second color different from the first color, and the plurality of third-color colored parts are configured to transmit light of a third color different from the first color and the second color, and the first-color colored part, the second-color colored part, and the third-color colored part are respectively formed in the three colored regions of the four rectangular sub-regions in each of the rectangular unit regions.

5. The color filter of claim 4, wherein the colored parts are formed respectively in the three colored regions at an equal area ratio.

6. The color filter of claim 5, wherein the equal area ratio is 85% or more.

7. The color filter of claim 5, wherein the equal area ratio is 80% or more.

8. The color filter of claim 2, wherein the colored parts are formed respectively in the three colored regions at an equal area ratio.

9. The color filter of claim 8, wherein the equal area ratio is 80% or more.

10. The color filter of claim 8, wherein the equal area ratio is 85% or more.

11. The color filter of claim 1, wherein the rectangular sub-regions in each of the rectangular regions of the substrate are formed such that a plurality of sub-pixel electrodes in a reflective display device are formed in conformity with positions of the rectangular sub-regions respectively in each of the rectangular regions of the substrate, the plurality of first-color colored parts are configured to transmit light of a first color, the plurality of second-color colored parts are configured to transmit light of a second color different from the first color, and the plurality of third-color colored parts are configured to transmit light of a third color different from the first color and the second color, and the first-color colored part, the second-color colored part, and the third-color colored part are respectively formed in the three colored regions of the four rectangular sub-regions in each of the rectangular unit regions.

12. The color filter of claim 11, wherein the colored parts are formed respectively in the three colored regions at an equal area ratio.

13. The color filter of claim 12, wherein the equal area ratio is 80% or more.

14. The color filter of claim 12, wherein the equal area ratio is 85% or more.

15. A reflective display device, comprising:
the color filter of claim 11; and
a plurality of reflective display layers respectively positioned facing the rectangular sub-regions of the color filter and configured to change reflectance independently.

16. The color filter of claim 1, wherein the colored parts are formed respectively in the three colored regions at an equal area ratio.

17. The color filter of claim 16, wherein the equal area ratio is 80% or more.

18. The color filter of claim 16, wherein the equal area ratio is 85% or more.

19. A reflective display device, comprising:
   the color filter of claim 16; and
   a plurality of reflective display layers respectively positioned facing the rectangular sub-regions of the color filter and configured to change reflectance independently.

20. A reflective display device, comprising:
   the color filter of claim 1; and
   a plurality of reflective display layers respectively positioned facing the rectangular sub-regions of the color filter and configured to change reflectance independently.

* * * * *